(12) United States Patent
Oren et al.

(10) Patent No.: US 11,460,337 B2
(45) Date of Patent: Oct. 4, 2022

(54) METHOD FOR TRACKING LIFTING EVENTS AT A CONSTRUCTION SITE

(71) Applicant: Versatile Natures Ltd., San Francisco, CA (US)

(72) Inventors: Meirav Oren, San Francisco, CA (US); Ran Oren, San Francisco, CA (US); Barak Cohen, San Francisco, CA (US); Danny Hermann, San Francisco, CA (US)

(73) Assignee: Versatile Natures Ltd., San Francisco, CA (US)

( * ) Notice: Subject to any disclaimer, the term of this patent is extended or adjusted under 35 U.S.C. 154(b) by 340 days.

(21) Appl. No.: 16/853,577

(22) Filed: Apr. 20, 2020

(65) Prior Publication Data

US 2020/0386605 A1    Dec. 10, 2020

Related U.S. Application Data

(63) Continuation-in-part of application No. 15/607,897, filed on May 30, 2017, now abandoned.

(60) Provisional application No. 62/906,703, filed on Sep. 26, 2019.

(51) Int. Cl.
| | |
|---|---|
| *G01G 3/14* | (2006.01) |
| *B66F 11/04* | (2006.01) |
| *B66F 17/00* | (2006.01) |
| *B66C 13/16* | (2006.01) |
| *B66C 13/46* | (2006.01) |
| *B66C 23/90* | (2006.01) |

(52) U.S. Cl.
CPC ............... *G01G 3/14* (2013.01); *B66C 13/16* (2013.01); *B66C 13/46* (2013.01); *B66C 23/905* (2013.01); *B66F 11/046* (2013.01); *B66F 17/006* (2013.01)

(58) Field of Classification Search
CPC .......... G01G 3/14; G01G 19/14; B66C 13/16; B66C 13/46; B66C 23/905; B66C 13/40; B66F 11/046; B66F 17/006
See application file for complete search history.

(56) References Cited

U.S. PATENT DOCUMENTS

2019/0302794 A1*  10/2019  Kean ................... G05D 1/0231

* cited by examiner

*Primary Examiner* — Michael V Kerrigan
(74) *Attorney, Agent, or Firm* — Run8 Patent Group, LLC; Peter Miller

(57) ABSTRACT

One variation of a method for monitoring lift events at a construction site includes: deriving a lifting profile from a first timeseries of load values, output by a load sensor coupled to a crane hook, during a first time period; deriving an oscillation characteristic from a first timeseries of motion values, output by a motion sensor coupled to the crane hook, during the first time period; identifying a type of an object carried by the crane hook during the first time period based on the lifting profile and the oscillation characteristic; selecting a load handling specification for the object based on the type of the object; accessing a second timeseries of motion values output by the motion sensor during a second time period; and, in response to the second timeseries of motion values deviating from the load handling specification, activating an object motion alarm for the object.

20 Claims, 5 Drawing Sheets

METHOD FOR TRACKING LIFTING EVENTS AT A CONSTRUCTION SITE

CROSS-REFERENCE TO RELATED APPLICATIONS

This Application is a continuation-in-part application of U.S. patent application Ser. No. 15/607,897, filed on 30 May 2017, which is incorporated in its entirety by this reference.

This Application claims the benefit of U.S. Provisional Application No. 62/906,703, filed on 26 Sep. 2019, which is incorporated in its entirety by this reference.

TECHNICAL FIELD

This invention relates generally to the field of construction management and more specifically to a new and useful method for monitoring lift events at a construction site in the field of construction management.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
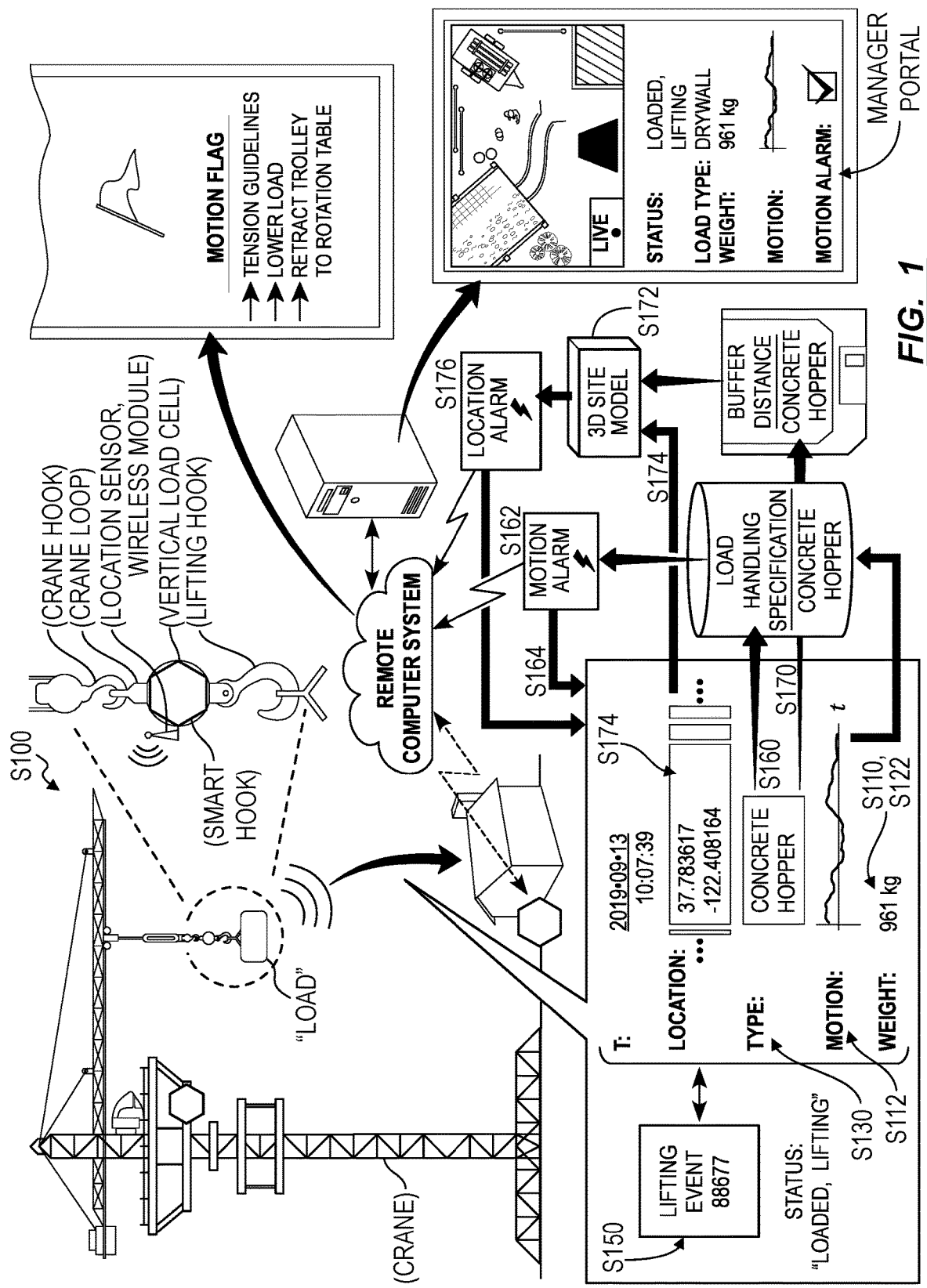
FIG. 1 is a flowchart representation of a method.
Figure 3:
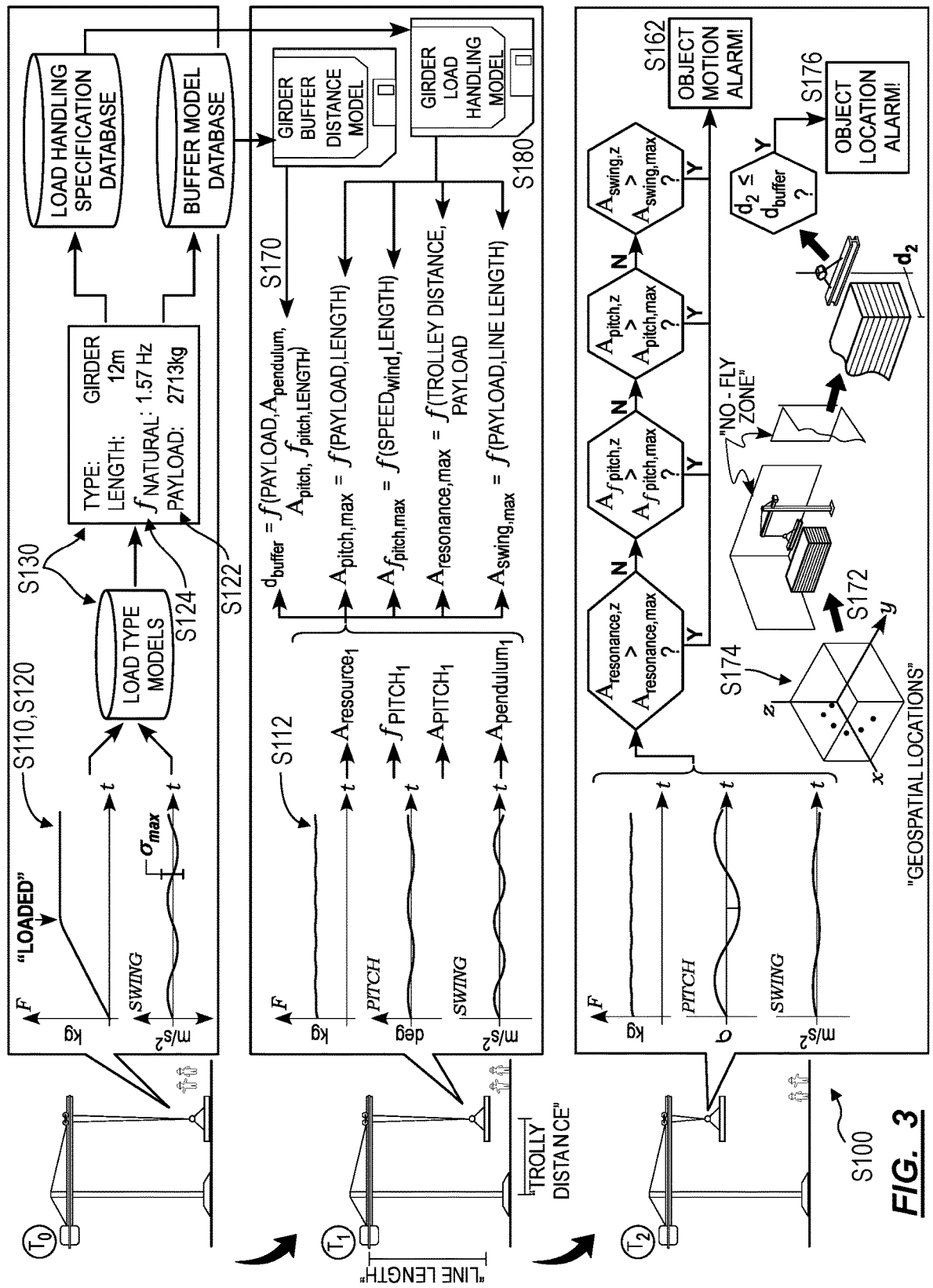
FIG. 3 is a flowchart representation of one variation of the method.

As shown in FIGS. 1 and 3, a method S100 for monitoring lift events at a construction site includes: accessing a first timeseries of load values output by a load sensor, coupled to a crane hook, during a first time period in Block Si10; deriving a set of characteristics of an object carried by the crane hook during the first time period based on the first timeseries of load values in Block S130; selecting a load handling specification for the object based on the set of characteristics of the object in Block S160; selecting a buffer distance for the object based on the set of characteristics of the object in Block S170; and accessing a georeferenced boundary of a no-fly zone proximal the construction site in Block S172. The method S100 also includes, during a second time period succeeding the first time period: accessing a second timeseries of load values output by the load sensor in Block S112; accessing a sequence of geospatial locations of the object, output by a position sensor coupled to the crane hook, during the second time period in Block S174; in response to the second timeseries of load values deviating from the load handling specification, activating an object motion alarm for the object in Block S162; and, in response to a geospatial location in the sequence of geospatial locations of the object falling within the buffer distance of the georeferenced boundary of the no-fly zone, activating an object location alarm in Block S176.

One variation of the method S100 shown in FIGS. 1 and 3 includes: accessing a first timeseries of load values output by a load sensor, coupled to a crane hook, during a first time period in Block S110; accessing a first timeseries of motion values output by a motion sensor, coupled to the crane hook, during the first time period in Block S112; deriving a lifting profile from the first timeseries of load values in Block S120; deriving an oscillation characteristic from the first timeseries of motion values in Block S124; identifying a type of an object carried by the crane hook during the first time period based on the lifting profile and the oscillation characteristic in Block S130; selecting a load handling specification for the object based on the type of the object in Block S160; accessing a second timeseries of motion values output by the motion sensor during a second time period succeeding the first time period in Block S112; and, in response to the second timeseries of motion values deviating from the load handling specification, activating an object motion alarm for the object during the second time period in Block S162.

Another variation of the method S100 shown in FIGS. 1 and 3 includes: accessing a first timeseries of load values output by a load sensor, coupled to a crane hook, during a first time period in Block S110; deriving a set of characteristics of an object carried by the crane hook during the first time period based on the first timeseries of load values in Block S130; identifying a type of the object based on the set of characteristics in Block S130; selecting a buffer distance for the object based on the type of the object in Block S110; accessing a georeferenced boundary of a no-fly zone proximal the construction site in Block S12; accessing a sequence of geospatial locations of the object, output by a position sensor coupled to the crane hook, during a second time period succeeding the first time period in Block S174; and, in response to a geospatial location, in the sequence of geospatial locations of the object, falling within the buffer distance of the georeferenced boundary of the no-fly zone, activating an object motion alarm during the second time period in Block S176.

The method S100 can further include: generating a lift event record defining the type of the object, the payload size of the object, a pickup location at the first geospatial location, and a drop-off location at the second geospatial location in Block S150; writing a motion control flag to the lift event record for the object in response to the second timeseries of motion values deviating from the load handling specification in Block S164; and writing a location control flag to the lift event record for the object in response to a geospatial location of the object falling within the buffer distance of the georeferenced boundary of the no-fly zone in Block S164.

2. Applications

Generally, Blocks of the method S100 can be executed by or in conjunction with a "smart hook" carried by a crane at a construction site in order to access non-visual data from sensors integrated into the smart hook, to automatically identify objects (e.g., materials, tools, equipment) moved throughout the job site by the crane, and to generate records of lift events at the construction site. In particular, while the smart hook is carried by a crane and manipulated by the crane and construction staff to move tools and materials within a construction site, a remote computer system or a controller integrated into the smart hook can execute Blocks of the method S100 to: access load, motion, optical, and/or geospatial location data from the smart hook; interpret types of these loads carried by the crane; and generate lift event records representing types, magnitudes, locations, and trajectories of these loads moving throughout the construction site over time.

For example, the smart hook (or the remote computer system) can implement template matching, deep learning, and/or artificial intelligence techniques to distinguish different types of objects lifted by the separation membrane, such as including: a long steel beam based on a linear increase in load measured by the weight sensor in the smart hook as the beam is lifted and low-amplitude natural vibrations between 100 Hz and 1000 Hz measured by a motion sensor (e.g., an inertial measurement unit, an accelerometer) in the smart hook once the beam is fully lifted; a bundle of loose rebar based on a continuous but non-linear increase in load measured by the weight sensor as the bundle is lifted and moderate-amplitude natural vibrations between 0.1 Hz and 5 Hz measured by the motion sensor once the bundle is fully lifted; and a loaded concrete hopper based on high-amplitude oscillations between 0.1 Hz and 2 Hz (i.e., from wet concrete "sloshing" inside a drum in the concrete hopper) and lower-amplitude, higher-frequency machine vibrations (i.e., from a motor rotating the drum) measured by the motion sensor once the concrete hopper is fully lifted. In these examples, the smart hook (or the remote computer system) can generate a lift event for each of these loads. For each of these lift events, the smart hook can also store: a maximum (or "peak") weight measured by the weight sensor during the lift event; geospatial locations output by the geospatial position module when the load was first detected and then unloaded; and altitudes output by an altimeter in the smart hook when the load was first detected and then unloaded. Furthermore, when the concrete hopper is then unloaded, lifted away from the drop-off location, and returned to the pickup location, the smart hook (or the remote computer system) can record a change in weight of the concrete hopper as an amount of concrete delivered to this drop-off location and write this amount of concrete to the corresponding lift event record.

Therefore, the smart hook (and/or the remote computer system) can execute Blocks of the method S100 to automatically detect types and other characteristics of object moved throughout a construction site by a crane and to generate a sequence of lift event records—representative of critical activities at the construction site—based on these data.

2.1 Applications: Material Handling Control

The smart hook (or the remote computer system) can then: retrieve load handling specifications for objects carried by the smart hook during lift events; track motion of these objects during these lift events; verify that motion of these objects during these lift events falls within these load handling specifications; and then issue alarms and serve notifications—such as to a crane operator, a site manager, and/or personnel nearby—in real time when motion of these objects falls outside of their prescribed load handling specifications or approaches limits defined in these prescribed load handling specifications.

In particular, after automatically identifying a type of an object lifted by the smart hook as described above, the smart hook (or the remote computer system) can retrieve a load handling specification for the type of the object, such as including: a maximum pendulum (or "swing") amplitude; maximum pitch and yaw rotation speeds; a maximum vibration amplitude at a natural frequency (e.g., for a steel girder, for a bundle of rebar); and/or a maximum vibration amplitude at a sloshing frequency (e.g., for a loaded concrete hopper). The smart hook (or the remote computer system) can also: derive characteristics of the object based on weight and/or motion data collected by the smart hook as the object is loaded onto and lifted by the smart hook; and adjust these baseline motion limits defined in this load handling specification according to these object characteristics.

More specifically, the smart hook (or the remote computer system) can execute Blocks of the method S100 to monitor and verify handling of materials according to load handling specifications designated for particular material types moving within the construction site and selectively trigger alarms in order to initiate actions (e.g., by a crane operator, a site manager, nearby personnel, autonomous systems) to: limit probability of partial or total load loss; limit probability of partial or total failure of guidelines, rigging, and crane cabling; limit wear on the crane, smart hook, and crane cabling; and/or maintain a minimum amount of control and recovery potential for the object.

2.2 Applications: Material Location Control

The smart hook can similarly interface with the remote computer system to: access or load georeferenced "no-fly" (or "keep-out") zones within and around the construction site; monitor locations of objects carried by the smart hook during lift events; define offset (or "buffer") distances from these no-fly zones for these objects based on types of these objects; and selectively issue alarms and serve notifications—such as to a crane operator, a site manager, and/or personnel nearby—in real time when these objects come within their buffer distances of these no-fly zones.

In particular, after automatically identifying a type of an object lifted by the smart hook as described above, the smart hook (or the remote computer system) can retrieve a buffer distance for the type of the object, such as including: a fixed offset distance from a no-fly boundary based on the type of the object; or a parametric model for calculating an offset distance for the object based on the type, weight, length, and/or motion of the object. The smart hook (or the remote computer system) can: assign (and update) a buffer distance for a particular object carried by the smart hook event based on data collected by sensors in the smart hook during a lift event; monitor the geospatial location of the smart hook and the object during this lift event; and then trigger an alarm if the geospatial location of the smart hook falls within the assigned buffer distance of a geospatial boundary of a no-fly zone within or around the construction site.

More specifically, the smart hook (or the remote computer system) can execute Blocks of the method S100 to monitor handling of materials by a crane, to dynamically adjust buffer distances of these materials from no-fly zones within and around the construction site based on how these materials are handled, and to selectively trigger alarms when materials carried by the smart hook fall within their buffer distances of such no-fly zones.

3. Local v. Remote Load Identification and Lift Event Record Generation

The method S100 is described herein as executed locally by the smart hook. For example, the smart hook can include an integrated controller that locally executes Blocks of the method S100 to generate lift event records, select or define load handling specifications, select or define buffer distances, and selectively issue object motion alarms and object location alarms based on data collected by sensors integrated into the smart hook. The smart hook can then: transmit lift event records to a local computing device and/or to a remote computer system for storage, construction activity timeline generation, and/or insight extraction; and transmit alarms to a crane operator panel, site manager, etc.

However, Blocks of the method S100 can additionally or alternatively be executed by a computer system (hereinafter the "remote computer system") remote from the smart hook based on load, geospatial location, motion, and/or camera data collected and broadcast by the smart hook during operation at the construction site. For example, the smart hook can record and transmit these data to a local wireless gateway over a local wireless network. The wireless gateway—such as located inside a cab or near a base of the crane—can then return these data to a remote computer system (e.g., a remote server) via a computer network (e.g., a computer network, a local area network). Alternatively, the smart hook can transmit these data directly to the remote computer system, such as via a cellular network. The remote computer system can then execute Blocks of the method S100 remotely to generate lift event records and to trigger alarms for the construction site.

In another example, the smart hook transmits data to a local computing device located on the construction site—such as a desktop computer, laptop computer, or mobile device—via a local wireless network; and the local computing device then executes Blocks of the method S100 locally to generate lift event records for the construction site. However, the smart hook and/or any other local or remote computer system can execute Blocks of the method S100 in (near) real-time or asynchronously to automatically generate lift event records and to issue alarms for materials and equipment moved throughout the construction site by a crane.

4. Smart Hook

Figure 5:
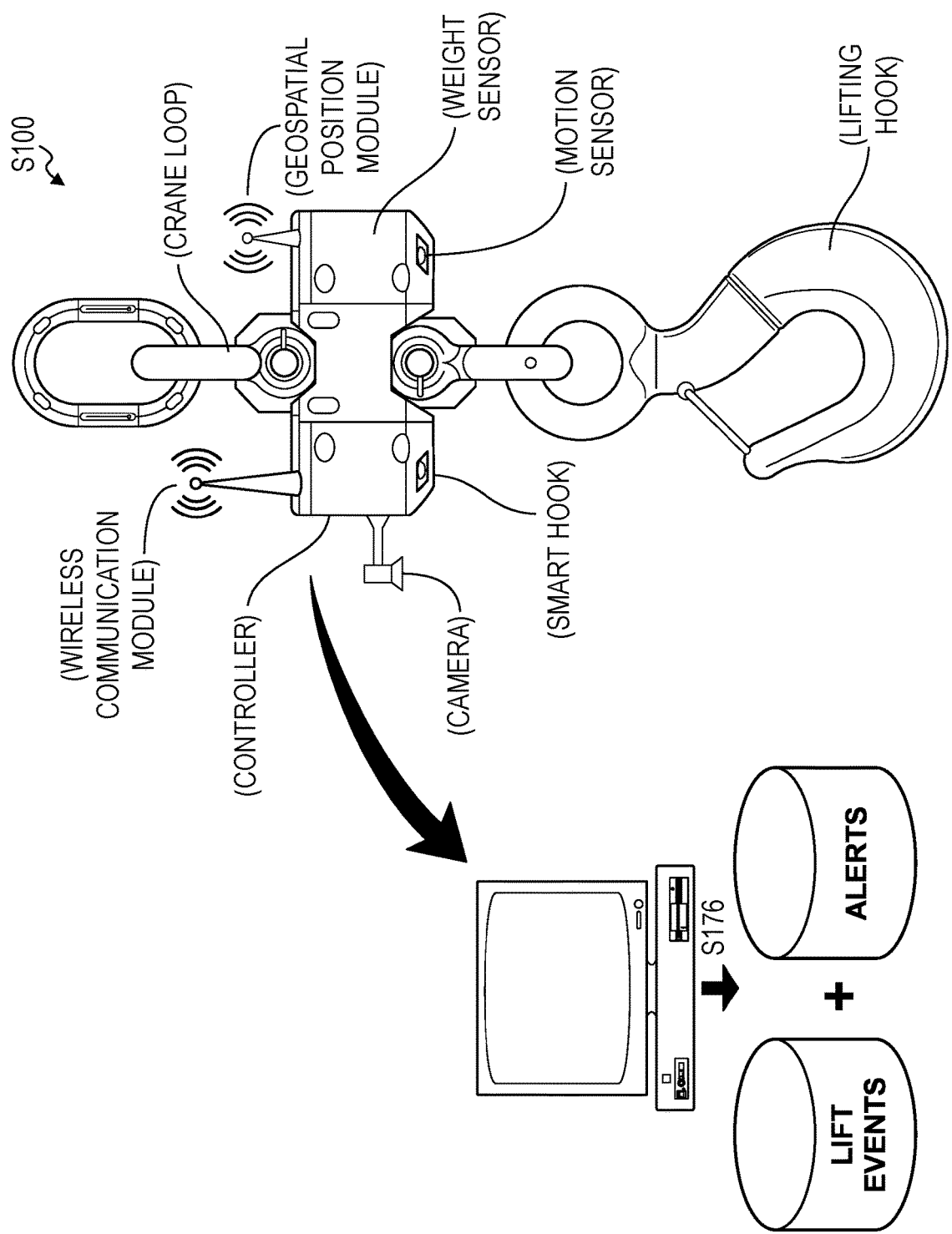
FIG. 5 is a flowchart representation of one variation of the method.

In one implementation shown in FIG. 5, the smart hook includes: a crane loop (e.g., a "welded link," "oval ring," or shackle) configured to transiently (i.e., temporarily, removably) install on a crane hook of a crane; a lifting hook arranged below the crane hook and configured to couple to a load; a weight sensor (e.g., a load cell) interposed between the crane loop and the lifting hook and configured to output a signal representing a tensile force between the crane loop and the lifting hook; a motion sensor (e.g., a gyroscope, accelerometer, magnetometer, and/or IMU) configured to output signals representing accelerations and/or angular velocities of the smart hook; an optical sensor (e.g., a color camera, a depth sensor, a 3D camera, and/or an infrared camera) defining a field of view facing downward below the lifting hook; a geospatial position module configured to output its geospatial location; an altimeter configured to output a signal representative of the height of the smart hook; a controller configured to sample the weight sensor, the motion sensor, the optical sensor, and the geospatial position module and/or to transform these signals into lift event records according to the method S100; and a wireless communication module configured to transmit raw data output by the weight sensor, the motion sensor, the optical sensor, and the geospatial position module and/or to transmit lift event records to a remote computer system. (The smart hook can also include other sensors, such as an RFID reader, a humidity sensor, an infrared camera, an ultrasonic depth sensor, and/or a scanning LIDAR sensor.)

Generally, the smart hook can be rapidly deployed to cranes of various sizes and lifting capacities by placing the crane loop over a crane hook with the lifting hook hanging below the crane loop. A load (e.g., construction materials, construction equipment, scaffolding) may then be attached to the lifting hook, which transfers the weight of the load into the crane loop, which transfers the weight of the load and the smart hook into the crane hook thus carried by the crane. In particular, the smart hook: is configured for rapid deployment to a crane without modification to structural elements of the crane; and includes sensors that enable tracking of load weight, motion, and 3D position (e.g., geospatial location and altitude) directly at the lifting hook carrying the load (i.e., rather than remotely from the load). Furthermore, because the smart hook is self-contained and is configured to install onto and hang below a crane hook integrated into a crane, the smart hook can be rapidly installed and removed from a crane hook by simply lifting the crane loop onto and off of a crane hook. Therefore, the smart hook may follow a general contractor or site manager to various job sites over time in order to supply load-related insights to the general contractor or site manager over time.

5. Setup/Onboarding

When the smart hook is deployed to a construction site, a site manager (e.g., a general contractor) can upload a site schedule—defining an ordered or time-referenced sequence of activities (or "tasks") planned at the construction site during a project—to a manager portal, such as accessed through a web browser or native application executing on a desktop computer or mobile device (e.g., a smartphone, a tablet). For example, the site manager can upload a table, Gantt chart, timeline, or other electronic document containing dates and/or time windows that materials and equipment—of specified types and/or of specified weights—are scheduled to move from pickup locations to drop-off locations on the construction site in order to remain on schedule. The remote computer system can then parse load type, load weight, load pickup location, load drop-off location, and load drop-off time window data from this electronic document and generate a lift event tags for these loads accordingly.

Alternately, the site manager can manually enter these data directly into the manager portal. However, the remote computer system can access and ingest material and equipment flow data for the construction site in any other way.

6. Active State

Blocks S110, S112, and S124 recite: accessing a first timeseries of load values output by a weight sensor, coupled to a crane hook, during a first time period; accessing a timeseries of load motion values output by a motion sensor, coupled to the crane hook, during the first time period; and accessing a first geospatial location of the crane hook during the first time period. Generally, once deployed to a construction site and upon entering an active state, the smart hook can sample its integrated sensors and aggregate these data in Blocks S110, S112, and S124.

In one implementation, once in the active state, the smart hook: samples the geospatial position module and records geospatial locations of the smart hook at regular intervals (e.g., once per ten-second interval); samples the altimeter (e.g., at 1 Hz); averages outputs of the altimeter over the sampling interval of the geospatial position module to calculate an average altitude of the smart hook during this interval; merges geospatial locations output by the geospatial position module and concurrent altitudes of the smart hook into "3D geospatial locations" of the smart hook during these intervals; and writes these timestamped 3D geospatial locations to a local rolling buffer (e.g., a one-minute rolling buffer) in local memory. In this implementation, the smart hook can also: sample the motion sensor (e.g., at a rate of 50 Hz); sample the weight sensor (e.g., at a rate of 10 Hz); record images (e.g., 2D color photographic images) output by the optical sensor (e.g., at a rate of 1 Hz); and write these timestamped 3D geospatial locations to the local rolling buffer.

Furthermore, the smart hook can: verify absence of vertical motion of the smart hook over a period of time based on outputs of the altimeter; verify minimal or no lateral motion (e.g., "swinging") of the smart hook over this period of time based on concurrent outputs of the motion sensor; and confirm absence of a load carried by the lifting hook during this period of time based on concurrent outputs of the weight sensor. Upon confirming absence of vertical motion, lateral motion, and a load on the lifting hook, the smart hook can tare the weight sensor, such as by averaging outputs of the weight sensor over this period of time (e.g., five seconds) and storing this average as a tare value of the weight sensor.

7. Live Crane Feed

While sampling these sensors when in the active state, the smart hook can also stream these data—such as including images recorded by the optical sensor, geospatial locations and altitudes of the smart hook, accelerations detected by the motion sensor and a weight (above the tare value) measured by the weight sensor—to the remote computer system. The remote computer system can then publish data to a live construction site feed accessible via the manager portal described above. (Additionally or alternatively, the remote computer system can then transmit real-time construction-related notifications in the form of SMS messages to the site manager's mobile device.) (or via another online portal). The site manager or other operator may then access this live construction site feed to view a live "bird's-eye view" of the construction site and to monitor the current weight magnitude carried by the smart hook, current movement of the smart hook, the current altitude of the smart hook, and the current geospatial location of the smart hook.

8. Object Types and Object Models

Figure 2:
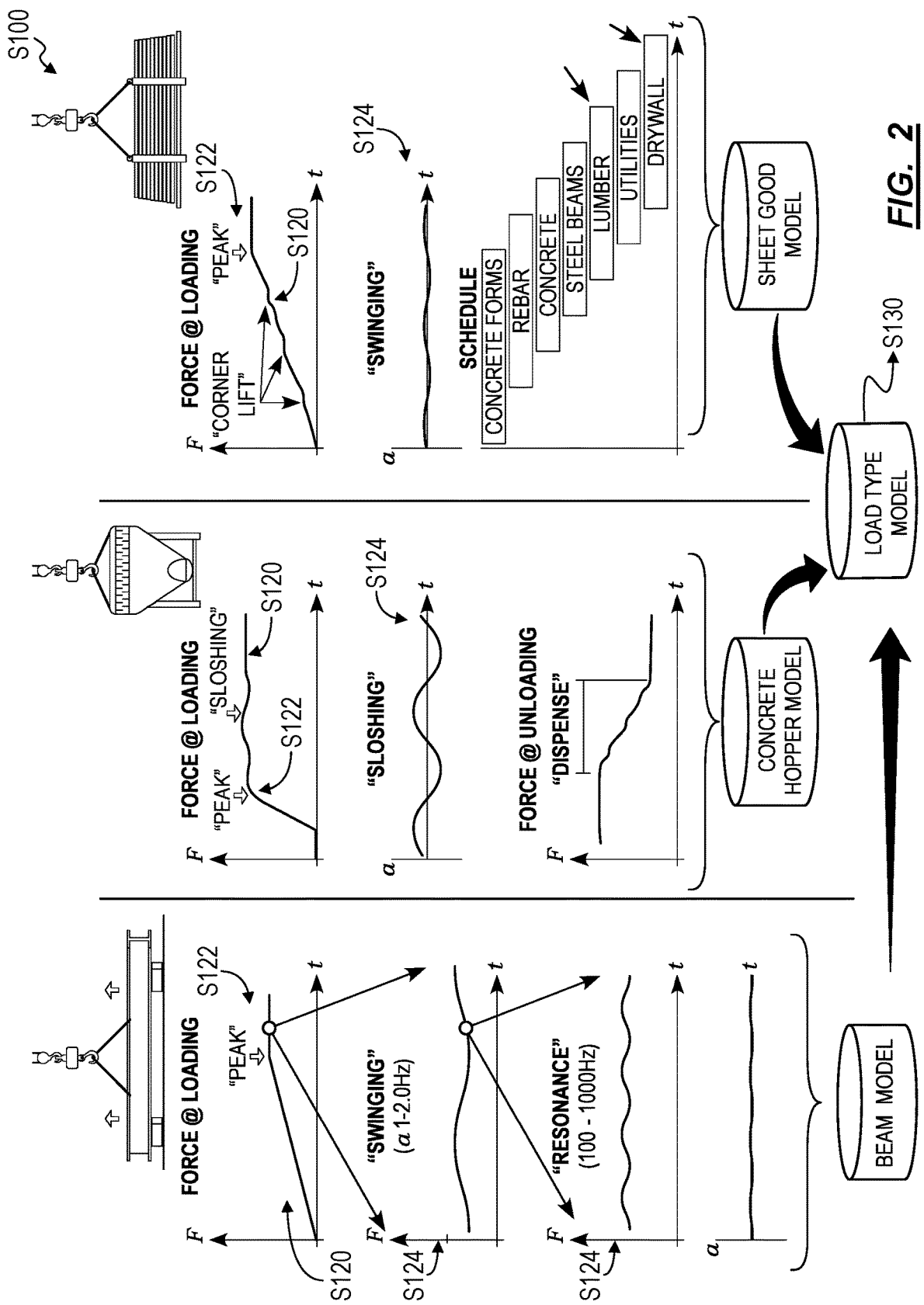
FIG. 2 is a flowchart representation of one variation of the method.

In one variation shown in FIG. 2, upon entering the active state, the smart hook retrieves a list of object types scheduled for movement through the construction site around the current time and/or object models (e.g., template motion profiles, template load profiles, or neural networks) for identifying types of these objects.

In one implementation, upon entering the active state (e.g., when moved, when manually activated, or at the start of a scheduled work day or work week), the smart hook queries the remote computer system for types of objects designated in scheduled crane-related activities in the site schedule—such as concrete, steel beams, rebar, and/or scaffolding elements—around a current time, such as: on the current work day; during the current work week; up to 24 hours before and up to 24 hours after the current time; or for the duration of the project at the construction site. In this implementation, the remote computer system queries the site schedule for object types designated in these scheduled crane-related activities and returns a list of these object types to the smart hook. More specifically, the remote computer system can return a list of object types that represents objects that the crane is likely to lift—via the smart hook—during a current work period. The smart hook can store this list of object types in local memory and/or adjust local object models to reflect a high probability or expectation that the smart hook will interface with objects of these types during the upcoming work period.

In this variation, the remote computer system can also return additional data related to these scheduled crane-related activities to the smart hook, such as: an order or schedule of lift events for particular object types at the construction site; approximate weights or weight ranges of object types designated in these scheduled lift events during the work period; last known geospatial locations of specific objects designated in this lift events; and/or geospatial locations that objects of specific types or objects associated with specific lift events are stored or staged at the construction site; etc. The smart hook can also store these object data in local memory.

Additionally or alternatively, in this variation, the smart hook can also download object models for identifying these object types, such as in the form of: weight ranges and loading/unloading profiles (or "template curves") for distinguishing object types in timeseries load data output by the weight sensor; natural frequency ranges or resonance profiles (or "template vibration curves") for distinguishing object types in timeseries motion (e.g., acceleration, angular velocity) data output by the motion sensor; and/or template images, color models, and/or symbol models for identifying object types in images recorded by the optical sensor. (Additionally or alternatively, these object models can specify physical object characteristics (e.g., common dimensions, color) and/or operational knowledge (e.g., rigging methods, unloading and installation methods) and leverage these model data to identify an object carried by the smart hook.)

Alternatively, the smart hook can access neural networks or other models trained to distinguish object types based on timeseries load data, timeseries motion data, and/or photographic images.

9. New Lift Event

While in the active state, the smart hook can: sample the weight sensor; convert outputs of the weight sensor into weight magnitudes; and write these timestamped weight magnitudes—along with motion data read from motion sensors, geospatial location data, and altitude—to a local rolling buffer (e.g., a one-minute rolling buffer). When the weight magnitude measured by the weight sensor exceeds the stored tare value by more than a threshold weight (e.g., 50 kilograms), the smart hook can: detect a new lift event at the smart hook; initialize a new lift event record for this new lift event; and write contents of the buffer (e.g., raw sensor data) to the new lift event record. The smart hook can then continue to sample the weight sensor, the motion sensor, the geospatial position module, and the altimeter, etc. (e.g., at the same or greater sampling rates) and write these data to new lift event record.

Upon detecting a new lift event, the smart hook can also transmit a "loading" status to the remote computer system to indicate to the remote computer system that the smart hook is currently being loaded with an object. The remote computer system can then update a status of the smart hook in the manager portal to reflect this new status of the smart hook, thereby enabling the site manager or other operator viewing the manager portal to immediately see a live change in the status of the smart hook.

10. Load Identification

Blocks S120, S124, and S130 of the method S100 recite: extracting a lifting profile from the timeseries of load values; extracting an oscillation characteristic from the timeseries of motion values; and identifying a type of an object carried by the crane hook during the first time period based on the lifting profile and the oscillation characteristic in Block S130. Generally, in Blocks S120, S124, and S130, the smart hook can automatically identify a type of object (and other characteristics of this object) carried by the smart hook based on timeseries data collected by weight sensor and/or the motion sensor, etc. In particular, the smart hook can derive a "fingerprint" of the load in each of multiple sensor modalities, predict the identity of the load in this different sensor modalities based on data collected by these sensors, and then fuse these predictions to identify a type of the load with greater confidence.

10.1 Loading Profile

In one implementation, the smart hook: records a timeseries of weight values read from the weight sensor following the start of the new lift event; calculates a derivative of this timeseries of weight values; and isolates a segment of this timeseries exhibiting a null or near-null derivative and corresponding to a "loading period." The smart hook then extracts a loading profile (e.g., a curve geometry, a rate of change) from the timeseries of weight values recorded over this loading period and matches this loading profile to a template loading profile for a particular object type.

10.2 Motion Profile

The smart hook can similarly: monitor lateral and vertical timeseries acceleration signals output by a multi-axis accelerometer (e.g., within an inertial measurement unit) in the smart hook; and identify the object based on these timeseries acceleration values. For example, the smart hook can identify a load carried by the smart hook as a concrete hopper in response to detecting a low-frequency, decaying signal component in a signal—output by a horizontal axis in an accelerometer integrated into the smart hook—which may result from concrete sloshing laterally inside the concrete hopper.

Additionally or alternatively, the smart hook can similarly: monitor angular velocity signals output by a multi-axis gyroscope (e.g., within the inertial measurement unit) in the smart hook; and identify the object based on these timeseries angular velocity values. For example, because longer objects may angularly accelerate at slower rates than shorter objects of the same mass, the smart hook can: calculate a confidence score that an object carried by the smart hook is an elongated steel beam inversely proportional to a change in yaw rate detected by the multi-axis gyroscope during the lift event; and calculate a confidence score that the object is a stack of sheet materials proportional to this change in yaw rate.

10.3 Weight

In another implementation, the smart hook stores common weight ranges for objects of different types (e.g., full or empty concrete hoppers, steel beams, concrete forms, full stacks of sheet goods, rebar bundles), such as common weight ranges for many construction projects or for the particular construction site currently occupied by the smart hook. The smart hook can then: derive a payload size (or "weight") of the object from load data captured by the weight sensor in Block S122; and calculate a confidence score that an object currently carried by the smart hook is of a particular object type based on proximity of this payload size to a weight range associated with this particular object type.

10.4 Location

In yet another implementation, the smart hook stores: last known geospatial locations and altitudes of objects of known types at the construction site; geospatial locations and altitudes of staging areas for particular object types at the construction site; and/or geospatial locations and altitudes of drop-off (or "delivery") locations for particular object types at the construction site, such as a function of date, week, or project stage at the construction site. The smart hook can then calculate a confidence score that an object currently carried by the smart hook is of a particular object type based on proximity of the geospatial location of the smart hook when the object was loaded to a last known location of objects of this type and/or to an assigned staging area of objects of this type. Similarly, as the object is unloaded from the smart hook at the end of a lift event, the smart hook can calculate a confidence score that an object currently carried by the smart hook is of a particular object type based on proximity of the geospatial location of the smart hook when the object was unloaded to a drop-off location assigned to objects of this type.

The smart hook can also calculate or refine a confidence score that an object currently carried by the smart hook is of a particular object type based on proximity of the current time to a scheduled lift event designating this object type.

10.5 Images

In another implementation, the smart hook implements object detection, object recognition, optical characteristic recognition, template matching, and/or other computer vision techniques to identify the type of object loaded onto the smart hook based on features extracted from an image captured by the optical sensor.

For example, in response to detecting an increase in load—from a tare value—carried by the smart hook, the smart hook can: detect a new lift event; and capture a photographic image from a downward-facing camera integrated into the smart hook. The smart hook can then pass this photographic image into a convolution neural network to: extract features from a foreground in the photographic image; and identify the type of the object based on these features. Alternatively, after identifying the type of the object based on loading and motion data captured during this lift event, the smart hook can verify the object type thus identified based on this photographic image (e.g., based on features extracted from the photographic image).

In this implementation, the smart hook can also interpret pitch, roll, and/or yaw orientations of the object—relative to the smart hook—based on features detected in a photographic image. By repeating this process throughout a lift event, the smart hook can track the pitch, roll, and/or yaw orientations of the object—relative to the smart hook— throughout the lift event.

The smart hook can additionally or alternatively include other types optical sensors. For example, the smart hook can include a thermographic (or infrared) camera and can distinguish between metal (e.g., rebar, steel girders), wood (e.g., formwork), concrete, and other materials based on thermal signatures extracted from regions thermographic images depicting loads carried by the smart hook.

10.6 Fusion

Block S130 of the method S100 recites identifying a type of an object carried by the crane hook during the first time period based on the lifting profile and the oscillation characteristic. Generally, in Block S130, as the smart hook calculates confidence scores that an object currently loaded onto the smart hook is of a particular object type based on data collected by sensors integrated into the smart hook, the smart hook can aggregate these confidence scores for various object types across multiple sensor modalities into one prediction of the type of the object.

For example, if the smart hook predicts that an object is a stack of sheet goods based on a load profile and motion of the object during lifting, the smart hook can: identify the stack of sheet goods as a concrete form rather than a stack of drywall or lumber if the payload size measured by the weight sensor is below a threshold weight; and distinguish a stack of drywall (e.g., late in construction) from lumber (e.g., midway through construction) based on objects scheduled for lifting during the current work period.

In a similar example, the smart hook predicts that an object is one of a formwork and a rebar structure based on a weight and motion of the object during lifting. The smart hook continues to monitor weight and motion of the object as the object is lifted moved laterally, lowered, and unloaded and identifies statuses of the object and the smart hook accordingly. The smart hook can also track a duration of an unloading event as the object is unloaded from the smart hook. If these duration is longer than a threshold duration—such as defined in a formwork model—the smart hook can identify the object as a formwork; otherwise, the smart hook can identify this object as a rebar structure following conclusion of the unloading event.

In another example, if the pickup location and weight recorded by the smart hook during a current lift event indicate that the object is either a steel beam or a precast concrete structure, then the smart hook can: identify the object as a steel beam rather than a precast concrete structure if a secondary oscillating component of load and acceleration signals—output by the weight sensor and the motion sensor—are less than a threshold frequency (e.g., 1000 Hz); and then confirm that the object is a steel beam rather than a precast concrete structure if acceleration signals output by the motion sensor indicate that the object is oscillating about its pitch axis at a low frequency (e.g., less than 0.1 Hz).

Alternatively, the smart hook can implement a voting architecture, decision tree, linear regression, or any other structure to fuse or aggregate predictions for the type of object—based on sensor data of different types—into one predicted identity of the object. However, the smart hook can implement any other method or technique to identify the type of an object lifted by the smart hook in Block S150.

Therefore, the smart hook can identify a type of an object carried by the smart hook based on timeseries load, horizontal acceleration, vertical acceleration, and/or angular velocity signals during this lift event, such as: by identifying a template profile containing timeseries data nearest one, several, or all of these signals; or by passing one, several, or all of these signals into a neural network or other artificial intelligence system that outputs a prediction or a confidence score for a type of the object.

Upon identifying the type of the object, such as with greater than a threshold confidence, the smart hook can transmit an identifier for this object type to the remote computer system, and the remote computer system can update the manager portal to indicate that an object of this type is currently loaded onto the smart hook. The smart hook can also write the identifier of this object type to the current lift event record.

10.7 Artificial Intelligence and Deep Learning

In the foregoing implementations, the autonomous vehicle can additionally or alternatively execute artificial intelligence, machine learning, and/or deep learning techniques to: ingest timeseries load and/or motion data, etc. recorded as the object is lifted by the smart hook; and output a confidence score or rank for a type of the object carried by the smart hook. The smart hook can then execute the foregoing and subsequent methods and techniques according to a highest-confidence object type thus identified during a lift event.

10.8 Example: Concrete Hopper

In one example shown in FIG. 2, a concrete hopper may represent a relatively short, substantially rigid structure characterized by a short loading period relative to payload size (e.g., a loading profile with a steep slope) when lifted. However, concrete contained in the concrete hopper may "slosh" when the concrete hopper is moved or jostled during lifting. Therefore, a signal output by the weight sensor when a concrete hopper is loaded onto the smart hook may also be characterized by a large secondary oscillating component at a relatively low frequency (e.g., 0.5-2 Hz) and decaying rapidly. The smart hook can therefore: store a concrete hopper loading profile that represents these low loading-period-to-peak-load ratios and secondary oscillating signal components that quickly decay; and calculate a confidence score that an object being loaded onto the smart hook is a concrete hopper based on (e.g., proportional to) proximity (e.g., similarity) of a signal read from the weight sensor to this concrete hopper loading profile.

The smart hook can also calculate a sloshing frequency of the concrete hopper, such as by implementing Fourier analysis to extract a sloshing frequency from a motion signal and/or a load signal captured during this period. Furthermore, the smart hook can predict a fill level of the concrete hopper based on (e.g., proportional to) this sloshing frequency, such as: a fill level of 25% full for a sloshing frequency of 0.61 Hz; a fill level of 50% full for a sloshing frequency of 0.78 Hz; a fill level of 75% full for a sloshing frequency of 0.84 Hz; and a fill level of 90% full for a sloshing frequency of 0.86 Hz. The smart hook can then: record this sloshing frequency, the fill level, a total payload size, and the confidence score that the object is a concrete hopper to a new lift event record; retrieve or calculate a load handling specification for concrete hoppers; and/or retrieve or calculate a buffer distance for concrete hoppers.

10.9 Example: Steel Beam

In another example shown in FIG. 2, a steel beam may represent a relatively long, substantially rigid structure. Therefore, a signal output by the weight sensor when a steel beam is loaded onto the smart hook may be characterized by a short loading period relative to payload size (e.g., a loading profile with a steep slope) when lifted, similar to a concrete hopper. However, the ends of the beam may vibrate about the lift point at a natural frequency of the beam once the beam is fully lifted. Therefore, a signal output by the weight sensor once the steel beam is fully loaded onto the smart hook (e.g., immediately following the lifting period) may be characterized by a higher-frequency (e.g., 100-1000 Hz), low-amplitude secondary oscillating component that decays slowly. The smart hook can therefore: store a steel beam loading profile that represents these low loading-period-to-peak-load ratios and secondary oscillating signal components that decay slowly; and calculate a confidence score that an object loaded onto the smart hook is a steel beam based on proximity of a signal read from the weight sensor to this steel beam loading profile. (Furthermore, because the frequency of this low-amplitude secondary component of the load signal may be a function of the length, material, and area moment of inertia of the beam, the smart hook can also estimate a length and a size of the beam based on the frequency of this secondary oscillating component of the load signal.)

The smart hook can also: calculate a natural frequency of the steel beam (e.g., by implementing Fourier analysis) based on a motion signal and/or a load signal captured during this period; estimate a length of the steel beam based on (e.g., inversely proportional to) the natural frequency; record this natural frequency, this estimated length, a total payload size, and the confidence score that the object is a steel beam to a new lift event record; retrieve or calculate a load handling specification for steel beams; and/or retrieve or calculate a buffer distance for steel beams.

10.10 Example: Rebar

In another example, a bundle of rebar beam may represent a relatively long, substantially flexible structure in which ends of the bundle remain loaded on the ground or other structure below as the middle of the bundle is lifted. Therefore, a signal output by the weight sensor when a bundle of rebar is loaded onto the smart hook may be characterized by a longer loading period relative to payload size (e.g., a loading profile with a shallower slope) when lifted. Furthermore, the ends of the bundle of rebar may also vibrate about the lift point at a lower natural frequency once the bundle is fully lifted. Therefore, a signal output by the weight sensor once the bundle of rebar is fully loaded onto the smart hook (e.g., immediately following the lifting period) may be characterized by a lower-frequency (e.g., 10-100 Hz), higher-amplitude secondary oscillating component that decays slowly. The smart hook can therefore: store a rebar bundle loading profile that represents these higher loading-period-to-peak-load ratios and secondary oscillating signal components that decay slowly; and calculate a confidence score that an object loaded onto the smart hook is a rebar bundle based on proximity of a signal read from the weight sensor to this rebar bundle loading profile. (Furthermore, because the frequency of this higher-amplitude secondary component of the load signal may be a function of the length, material, and area moment of inertia of the rebar in this bundle, the smart hook can also estimate lengths and sizes of rebar in this bundle based on the frequency of this secondary oscillating component of the load signal.)

The smart hook can also: calculate a natural frequency of the rebar bundle (e.g., by implementing Fourier analysis) based on a motion signal and/or a load signal captured during this period; estimate a length of the rebar bundle based on (e.g., inversely proportional to) the natural frequency; record this natural frequency, this estimated length, a total payload size, and the confidence score that the object is a rebar bundle to a new lift event record; retrieve or calculate a load handling specification for rebar bundles; and/or retrieve or calculate a buffer distance for rebar bundles.

10.11 Example: Sheet Goods

In yet another example shown in FIG. 2, a stack of sheet goods (e.g., plywood, drywall) may represent a relatively short, substantially rigid structure with a low natural frequency, and corners of the stack of sheet goods may lift in series from the ground or support structure when the stack of sheet goods is loaded onto the smart hook. Therefore, a signal output by the weight sensor when a stack of sheet goods is loaded onto the smart hook may be characterized by a short loading period relative to payload size (e.g., a loading profile with a steep slope) when lifted, and this loading profile may exhibit three or more discontinuities, peaks, or inflections as the stack of sheet goods is lifted. Furthermore, the stack of sheet goods may vibrate about the lift point at a very high natural frequency (e.g., greater than 2000 Hz) once the stack is fully lifted. Therefore, a signal output by the weight sensor once the stack of sheet goods is fully loaded onto the smart hook (e.g., immediately following the lifting period) may be characterized by a higher-frequency (e.g., 10-100 Hz), lower-amplitude secondary oscillating component that decays slowly. The smart hook can therefore: store a sheet good loading profile that represents these lower loading-period-to-peak-load ratios and secondary oscillating signal components that decay slowly; and calculate a confidence that score that an object loaded onto the smart hook is a sheet good based on proximity of a signal read from the weight sensor to this sheet good loading profile.

11. Load Handling Specification

Block S160 of the method S100 recites selecting a load handling specification for the object based on the type of the object. Generally, in Block S160, the smart hook can retrieve and/or calculate limits for motion of the object during the lift event in order to limit risk of damage to the crane, damage to the smart hook, loss of some or all of the load, or loss of control of the load or the crane more generally, as shown in FIGS. 1 and 3.

For example, probability of partial load loss from rebar bundles, stacks of sheet goods, and concrete hoppers may increase as a function of (e.g., proportional to): absolute pitch and roll angle from a nominal position; and pitch and yaw oscillation frequency. Similarly, control of a load and propensity to correct motion of the load (e.g., with guidelines) may diminish as a function of (e.g., proportional to) yaw rate, maximum width, total weight, and pendulum (e.g., "swinging") rate and amplitude of the load. Furthermore, wear and probability of damage to or failure of rigging lines and crane cabling may increase as a function of cyclic loading, such as due to resonance of a load, load pitching and rolling under the smart hook, and swinging of the load and smart hook under the crane. Therefore, upon identifying an object loaded onto the smart hook, the smart hook can retrieve or calculate a load handling specification defining motion restrictions that, when maintained for the object during the lift event: limit probability of partial or total load loss; limit probability of partial or total failure of guidelines, rigging, and crane cabling; limit wear on the crane, smart hook, and crane cabling; and/or maintain a minimum amount of control and recovery potential for the object.

In one implementation, the smart hook retrieves a predefined load handling specification for a type of the object identified under the smart hook, such as defining: a maximum yaw oscillation rate; maximum pitch and roll oscillation rates; a maximum yaw rate; maximum pitch and roll rates; maximum pitch and roll angles (or amplitudes); a maximum pendulum (or "swing") rate; a maximum pendulum amplitude (or angle); and/or a maximum amplitude at a natural frequency (i.e., a resonance amplitude).

In another implementation, after identifying a type of the object carried by the smart hook, the smart hook retrieves a load handling specification containing parametric models for all or a subset of these parameters for a particular type of the object currently loaded on the smart hook. The smart hook then calculates all or a subset of the foregoing motion parameters for the object based on: these parametric models; and signals output by sensors in the smart hook during this lift event (e.g., payload size, fill level).

11.1 Example: Concrete Hopper

In one example, the smart hook can identify an object carried by the smart hook during a lift event as a concrete hopper and then retrieve a load handling specification—from a set of load handling specifications—specific to concrete hoppers. In this example, the load handling specification for concrete hoppers can include: parametric functions for deriving characteristics of the concrete hopper and its motion from load and motion signals captured by sensors in the smart hook; and parametric models for calculating motion limits of the concrete hopper based on these characteristics. In particular, the smart hook can: derive a sloshing frequency of the concrete hopper based on a timeseries of accelerations measured by the motion sensor and/or based on a timeseries of load values measured by the weight sensor during the lift event; and estimate a fill level of the concrete hopper based on the total weight and/or the sloshing frequency of the concrete hopper based on the load handling specification. Because probability of spillage from the concrete hopper may increase as a function of fill level, pendulum amplitude, and pitch and roll angle of the concrete hopper, the smart hook can also: set maximum pitch and roll angles of the concrete hopper inversely proportional to the fill level; and similarly set a maximum pendulum (or "swing") amplitude of the concrete hopper inversely proportional to the fill level according to parametric functions defined in the load handling specification.

Thus, if the smart hook detects pitching or rolling of the concrete hopper in excess of these pitch and roll limits or if the smart hook detects swinging of the concrete hopper in excess of the maximum pendulum amplitude during the remainder of the lift event, the smart hook can trigger an alarm at a crane operator command center to prompt the crane operator to execute a recover action, such as: slowing the crane to reduce pitching, rolling, or swinging of the concrete hopper; and/or lowering the smart hook to reduce scope of damage from partial or total loss of the concrete hopper and its contents. The smart hook can also: output an audible alarm or send a notification to a worker carrying a guideline to address pitching, rolling, or swinging of the concrete hopper; output an audible alarm to alert nearby personnel of possible falling material; transmit a material mismanagement notification to a site manager; and/or record a material mismanagement event to a lift event record for this lift event.

In a similar example, the smart hook can: derive a lifting profile—representing transition of a weight of an object to the smart hook over a loading duration—from a timeseries of load values captured by the weight sensor; derive a sloshing frequency from a timeseries of motion values concurrently captured by the motion sensor; identify the object as a concrete hopper based on the loading duration and the sloshing frequency; and select a load handling specification—from a set of load handling specifications—for concrete hoppers based on the type of the object. The smart hook can then: estimate a fill level of the concrete hopper proportional to the sloshing frequency; calculate a pendulum amplitude threshold and a pitch threshold inversely proportional to the fill level according to the load handling specification; and assign these pendulum amplitude threshold and pitch threshold limitations to the object. Throughout the remainder of the lift event, the smart hook can interpret a pendulum amplitude of the object and interpret a pitch angle of the object based on subsequent load and/or motion values output by the motion and/or weight sensors. The smart hook can then issue an object motion alarm in response to one of: the first pendulum amplitude of the object exceeding the first pendulum amplitude threshold; and the first pitch angle of the object exceeding the first pitch threshold.

11.2 Example: Girder

In another example, the smart hook can identify an object carried by the smart hook during a lift event as a steel girder (e.g., an "elongated structural member") and then retrieve a load handling specification—from a set of load handling specifications—specific to elongated structural members. In this example, the load handling specification for elongated structural members can include: parametric functions for deriving characteristics of the girder and its motion from signals output by sensors in the smart hook; and parametric models for calculating motion limits of the girder based on these characteristics. In particular, the smart hook can: record a total weight of the girder based on a laden weight measured by the weight sensor during the lift event; derive a natural frequency of the girder based on a timeseries of accelerations measured by the motion sensor and/or based on a timeseries of load values measured by the weight sensor during the lift event (and based on a predicted rigging scheme for the girder); and estimate a length of the girder based on the natural frequency. Because probability of line failure, load loss, and/or crane damage while carrying an elongated structural member may increase as a function of payload, resonance amplitude, unbalanced lifting, and pendulum amplitude, etc., the smart hook can also: set a pitch limit of the girder inversely proportional to the length of the girder; and set a maximum resonance amplitude (i.e., vibration at the natural frequency) inversely proportional to the weight of the girder, as defined by the load handling specification for elongated structural members.

Additionally or alternatively, the smart hook can set a maximum pendulum amplitude of the girder based on the weight of the girder. For example, the smart hook can: read a payload size of the girder from load values captured by the weight sensor; read a current altitude of the smart hook from an altimeter integrated into the smart hook; and predict a current line length of the cable carrying the girder based on the altitude. Alternatively the smart hook can: derive a "swinging" frequency from a lateral acceleration signal output by the motion sensor; and interpret the line length of the crane cable from this swinging frequency. Because larger payloads carry larger loads into the crane and because large swinging amplitudes at shorter line lengths (i.e., higher altitudes) may correspond to less control of a load, the smart hook can then calculate a pendulum amplitude limit for the girder: proportional to the line length; and inversely proportional to the payload size of the object.

Thus, the smart hook can trigger an alarm in response to detecting pitching of the girder in excess of this pitch limit in order to alert the crane operator and/or nearby personnel of incorrect loading of the girder. Similarly, the smart hook can trigger an alarm in response to detecting swinging (e.g., lateral oscillation) of the girder in excess of this pendulum amplitude limit in order to alert the crane operator and/or nearby personnel of possible loss of control of the girder and cyclic loading that may damage the crane. Furthermore, the smart hook can trigger an alarm in response to detecting vibration of the girder in excess of the resonance amplitude limit in order to alert the crane operator and/or nearby personnel of uncontrolled resonance of the girder and cyclic loading that may damage the crane.

11.3 Example: Rebar

In another example, the smart hook can identify an object carried by the smart hook during a lift event as a bundle of rebar and then retrieve a load handling specification—from a set of load handling specifications—specific to rebar bundles. In this example, the load handling specification for rebar bundles can include: parametric functions for deriving characteristics of the rebar bundle and its motion from load and motion signals captured by sensors in the smart hook; and parametric models for calculating motion limits of the rebar bundle based on these characteristics. In particular, the smart hook can: record a total weight of the rebar bundle based on a laden weight measured by the weight sensor during the lift event; derive a natural frequency of the rebar bundle based on a timeseries of accelerations measured by the motion sensor and/or based on a timeseries of load values measured by the weight sensor during the lift event (and based on a predicted rigging scheme for the rebar bundle); and estimate a length of the rebar bundle based on the natural frequency. Because probability of loss of a rebar unit from this rebar bundle may increase as a function of resonance amplitude, pitch and roll angle, yaw rate, pendulum amplitude, and length of the rebar bundle, the smart hook can also: set a maximum resonance amplitude of the rebar bundle proportional to the length of the rebar bundle (e.g., because shorter rebar bundles may be bundled with fewer straps and may therefore be less secure) (and less than a maximum resonance amplitude of a girder of similar length); set maximum pitch and roll angles of the rebar bundle less than maximum pitch and roll angles of a girder of similar length; and set a maximum yaw rate and maximum pendulum amplitude less than maximum yaw rates and pendulum amplitudes of a girder and concrete hopper of similar weight, as prescribed by the load handling specification for rebar bundles.

Thus, the smart hook can trigger an alarm in response to detecting motion of the rebar bundle in excess of these limits in order to: alert the crane operator and/or nearby personnel of incorrect loading or loss of control of the rebar bundle; and/or alert nearby personnel of increased risk of falling rebar.

11.4 Other Object Types

The smart hook can implement similar methods and techniques to retrieve load handling specifications for other object types and to set or adjust motion parameters for these objects accordingly when identified during lift events.

Furthermore, the smart hook can define different combinations and magnitudes of maximum yaw oscillation rate, maximum pitch and roll oscillation rates, maximum yaw rate, maximum pitch and roll rates, maximum pitch and roll angles (or amplitudes), maximum pendulum (or "swing") rates, maximum pendulum amplitudes (or angles), and/or a maximum resonance amplitudes.

11.4 Other Factors

Additionally or alternatively, the smart hook can adjust the foregoing motion parameters based on the location of the smart hook (e.g., relative to a no-fly zone) and/or based on a position of a trolley—carrying the smart hook—on the jib of the crane. For example, in order to account for increasing torque on a base of the crane as the trolley moves further from the rotation table of the crane, the smart hook can: track its geospatial location; calculate a distance of the trolley from the rotation table based on a known geospatial location of the base of the crane; and reduce threshold swing, pitch, roll, and resonant oscillation amplitudes assigned to the object as this distance increases. In another example, in order to account for greater risk of a location event and/or greater risk of injury to nearby structures or persons, the smart hook can: track its geospatial location; calculate a shortest distance from the smart hook to a no-fly zone, as described below; and reduce threshold swing, pitch, roll, and resonant oscillation amplitudes and maximum pitch and roll orientations of the object as this distance decreases.

12. Buffer Distance

Block S170 of the method S100 recites selecting a buffer distance for the object based on the type of the object. Generally, in Block S170, the smart hook can select or calculate a buffer distance for an object carried by the smart hook based on: a type of this object; a dimension and weight of the object; and/or real-time orientation and motion characteristics of the object, such as its resonance amplitude, swing amplitude, pitch and roll angle, and/or yaw rate. The smart hook can then monitor the geospatial location of the smart hook and selectively trigger an alarm when the smart hook falls within this buffer distance of the georeferenced no-fly zone, thereby alerting a crane operator (and/or a site manager, nearby personnel) of increased non-compliance or risk.

In one implementation, the remote computer system maintains a geospatial map of no-fly zones (e.g., 2D or 3D georeferenced "keep-out" volumes or virtual barriers) for avoidance by objects carried by the crane and smart hook during operation, as described below. More specifically, the remote computer system can maintain a geospatial map that defines a working volume in which the crane is permitted to move objects into and within the construction site. A virtual boundary around this working volume can thus define a no-fly zone.

The smart hook can thus monitor its geospatial location throughout operation and selectively trigger alarms when the geospatial location of the smart hook crosses this boundary. Furthermore, to preemptively notify the crane operator of increased risk that an object carried by the smart hook will cross this boundary, the smart hook can select or calculate a buffer distance for this object based on a type of the object; and then trigger an alarm when the location of the smart hook falls within this buffer distance of the boundary while carrying this object. Yet further, because the size and motion of the object may effect a speed with which the crane may change the trajectory of the smart hook and/or may effect a total swept volume occupied by the object over a period of time (e.g., as the object pitches and swings), the smart hook can also adjust the buffer distance for the object as a function of the size, geometry, orientation, and motion of the object in (near) real-time during the lift event.

In one implementation, while carrying an object during a lift event, the smart hook can: interpret a pendulum amplitude of the object based on timeseries motion data collected by the motion sensor and/or timeseries load data collected by the weight sensor; and adjust a buffer distance for this object in real-time proportional to the pendulum amplitude of the object, thereby accounting for reduction in spatial control of the object as the object swings at greater amplitudes during the lift event.

In another implementation, while carrying an object during a lift event, the smart hook can monitor an orientation of the object, such as: by implementing dead reckoning techniques to interpret pitch and roll orientations of the object based on timeseries motion data collected by the motion sensor; or by detecting and tracking the pitch and roll orientations of the object in a sequence of photographic images captured by the downward-facing camera in the smart hook, as described above. The smart hook can similarly track yaw rate, pendulum amplitude, and resonance of the object. The smart hook can then estimate a probability of partial or total load loss as a function of (e.g., proportional to): pitch and roll orientations relative to a nominal position in a horizontal plane; yaw rate; pendulum amplitude; and/or resonance of the object; etc. The smart hook can then adjust the buffer distance for the object proportional to this probability of loss.

12.1 Example: Concrete Hopper

In one example, the smart hook can identify an object carried by the smart hook during a lift event as a concrete hopper; estimate a fill level of the concrete hopper based on a laden weight measured by the weight sensor at the beginning of the lift event; and retrieve a buffer distance model for concrete hoppers when the object is first loaded onto the smart hook during the lift event. Throughout the lift event, the smart hook can: monitor its geospatial location; monitor an altitude of the smart hook; monitor sloshing amplitude within the concrete hopper based on load data collected by the weight sensor; and monitor a pendulum amplitude of the concrete hopper based on motion data collected by the motion sensor. The smart hook can then: calculate a probability of spillage from the concrete hopper proportional to fill level, sloshing amplitude, and pendulum amplitude; and adjust the buffer distance for the concrete hopper proportional to this probability of spillage and proportional to the altitude of the smart hook according to the buffer distance model for concrete hoppers.

More specifically, the smart hook can: estimate a lateral distance that concrete may spill from the concrete hopper based on the altitude of the smart hook (and current measured, preset, or predicted local wind condition); and calculate a buffer distance based on a combination of this lateral distance and the probability of spillage. This buffer distance may therefore represent a distance from the no-fly boundary that is predicted to yield a high probability that spillage from the concrete hopper during this lift event will land outside of the no-fly zone.

Thus, if the geospatial location of the smart hook falls within the dynamic buffer distance of a georeferenced boundary of a no-fly zone near the construction site during this lift event, the smart hook can: trigger an alarm at a crane operator command center to prompt the crane operator to move the smart hook away from the no-fly zone; output an audible alarm or send a notification for possible falling material to personnel below; transmit a no-fly error to a site manager; and/or record a no-fly error to a lift event record for this lift event.

12.2 Example: Rebar Bundle

In another example, the smart hook can: identify an object carried by the smart hook during a lift event as a rebar bundle; record a total weight of the rebar bundle based on a laden weight measured by the weight sensor at the beginning of the lift event; derive a natural frequency of the rebar bundle based on a timeseries of accelerations measured by the motion sensor and/or based on a timeseries of load values measured by the weight sensor at the beginning of the lift event; estimate a length of the rebar bundle based on the natural frequency; and retrieve a buffer distance model for rebar. Throughout the lift event, the smart hook can: monitor its geospatial location; monitor an altitude of the smart hook; monitor a pitch angle of the rebar bundle based on load data collected by the motion sensor; and monitor a pendulum amplitude of the rebar bundle based on motion data collected by the motion sensor.

The smart hook (or the remote computer system) can then estimate a lateral distance that a rebar unit may traverse upon reaching the ground after spilling out of the rebar bundle based on: the altitude of the smart hook; (a current measured, preset, or predicted local wind condition;) a pitch angle of the rebar bundle; and a length of the rebar bundle. The smart hook can also calculate a probability of spillage from the rebar bundle, such as proportional to: the pitch angle of the rebar bundle; a pitch oscillation frequency of the rebar bundle; a resonance amplitude of the rebar bundle; and a pendulum amplitude of the rebar bundle.

The smart hook can then calculate a buffer distance for the rebar bundle based on a combination of this lateral distance and the probability of spillage according to the buffer distance model for rebar. This buffer distance may therefore represent a distance from the no-fly boundary that is predicted to yield a high probability that a rebar unit spilling from the rebar bundle during this lift event will land outside of the no-fly zone.

Thus, if the geospatial location of the smart hook falls within the dynamic buffer distance of a georeferenced boundary of a no-fly zone near the construction site during this lift event, the smart hook can respond to this increased risk of a non-compliance event and/or this increased risk to nearby persons and structures by: triggering an alarm at a crane operator command center to prompt the crane operator to move the smart hook away from the no-fly zone; outputting an audible alarm or sending a notification for possible falling material to persons below; transmitting a no-fly error to a site manager; and/or recording a no-fly error to a lift event record for this lift event.

12.3 Example: Cementitious Compound Pallet

In another example, the smart hook can: identify an object carried by the smart hook during a lift event as a pallet of bags (e.g., of joint compound, of mortar); record a total weight of the pallet based on a laden weight measured by the weight sensor at the beginning of the lift event; and retrieve a buffer distance model for rebar. Throughout the lift event, the smart hook can: monitor its geospatial location; monitor an altitude of the smart hook; monitor a pitch angle of the pallet based on load data collected by the motion sensor; and monitor a pendulum amplitude of the pallet based on motion data collected by the motion sensor.

The smart hook (or the remote computer system) can then estimate a lateral distance that a bag—on the pallet—may traverse upon reaching the ground after spilling off of the pallet based on: the altitude of the smart hook; a current measured, preset, or predicted local wind condition; and a pitch angle of the pallet. The smart hook can also calculate a probability of spillage from the pallet, such as proportional to: the pitch angle of the pallet; a pitch oscillation frequency of the pallet; and a pendulum amplitude of the pallet.

The smart hook can then calculate a buffer distance for the pallet based on a combination of this lateral distance and the probability of spillage according to the buffer distance model for a pallet. This buffer distance may therefore represent a distance from the no-fly boundary that is predicted to yield a high probability that a bag spilling from the pallet during this lift event will land outside of the no-fly zone.

Thus, if the geospatial location of the smart hook falls within the dynamic buffer distance of a georeferenced boundary of a no-fly zone near the construction site during this lift event, the smart hook can respond to this increased risk of a non-compliance event and/or this increased risk to nearby persons and structures by: triggering an alarm at a crane operator command center to prompt the crane operator to move the smart hook away from the no-fly zone; outputting an audible alarm or sending a notification for possible falling material to persons below; transmitting a no-fly error to a site manager; and/or recording a no-fly error to a lift event record for this lift event.

13. Load Verification and Object Type Refinement

Furthermore, the smart hook can repeat the foregoing methods and techniques to verify or refine the type of object thus identified in Block S150 based on additional data collected by the smart hook after the object is loaded onto the smart hook and until the object is subsequently unloaded. In particular, the smart hook can calculate increasing confidence scores for the identity of the object over time based on additional load, motion, and geospatial location data collected by the smart hook between a time the object is loaded onto the smart hook and a time that the object is unloaded from the smart hook.

In one example, ends of a long beam may be guided manually with rigging or tow lines when lifted at a pickup location and when lowered at a drop-off location. Manipulation of the beam via the rigging lines may yield acyclic vertical loads and acyclic angular velocities about the pitch and yaw axes of the steel beam with long ramp times and decay times. Therefore, if the smart hook detects acyclic load changes and acyclic angular velocities with long ramp times following detection of a payload size during a lift event, the smart hook can calculate a greater confidence that the object is a long beam.

In another example, when a long beam is lowered onto the ground or other structure below, one end of the beam may contact the ground first, thereby transferring some weight from this first end of the beam into the ground. As the length of the beam makes contact with the ground as the beam is further lowered, the weight of the beam carried by the smart hook may decrease continuously (e.g., approximately linearly). The load profile of the signal output by the weight sensor as a beam is unloaded from the smart hook may therefore be characterized by a substantially continuous downward slope from payload size to tare. Conversely, when a stack of sheet goods is lowered onto the ground or other structure, one corner of the stack may contact the ground first, thereby transferring some weight from this first corner of the stack into the ground. As the stack is further lowered, one edge of the stack may come into contact with the ground. As the stack is lowered even further and then fully unloaded from the smart hook, the opposing edge of the stack may come into contact with the ground. The load profile of the signal output by the weight sensor as a stack of sheet goods is unloaded from the smart hook may therefore be characterized by two or more discontinuities or inflections, which may differ from a load profile of a signal output by the weight sensor as a beam is unloaded from the smart hook, which may be characterized by one discontinuity or inflection.

In yet another example, a concrete hopper may be left attached and (partially) supported by the smart hook upon arrival at a drop-off location. Concrete may then be dispensed from the concrete hopper, and the concrete hopper may then be hoisted and moved away from this drop-off location by the smart hook. Therefore, once the concrete hopper is lowered at its drop-off location, the load measured by the weight sensor may decrease (slowly) from an initial payload size but may not reach the stored tare value before the measured load again increases as the concrete hopper is lifted. The smart hook can therefore identify an object as a concrete hopper if the object is delivered to a drop-off location at a first payload size and then removed from the drop-off location at a second, lower payload size without detecting fully unloading the object from the smart hook.

However, the smart hook can implement any other method or technique to identify and verify a type of object loaded onto the smart hook. Furthermore, upon refining an object type identification of an object carried by the smart hook, the smart hook can transmit an update of the detected object type to the remote computer system, and the remote computer system can update the manager portal to reflect this object type revision accordingly. The smart hook can also rewrite the identifier of this object type to the current lift event record.

13.1 Load Handling Specification and Buffer Distance Update

The smart hook can also retrieve an alternate load handling specification and buffer distance model in response to identifying the object as a different object type.

The smart hook can then repeat the foregoing methods and techniques to adjust load handling specifications and the buffer distance for the object—such as in real-time—based on additional load and motion data captured by the smart hook during the lift event.

14. Unidentified or Low-Confidence Load Identify

In one variation in which the smart hook fails to identify a type of an object carried by the smart hook with more than a minimum confidence (or without a clear object type frontrunner), the smart hook (or the remote computer system) can: select an image recorded by the optical sensor while the object is (or was) loaded on the smart hook; extract features in a near-field region of the image; and implement computer vision techniques (e.g., template matching, object recognition) to identify a type of the object based on these extracted features. Additionally or alternatively, in this variation, the remote computer system can transmit this image to a human annotator for manual object confirmation or labeling.

The remote computer system can then update non-visual load identification models described above based on this additional object confirmation or object label data. For example, the remote computer system can: access and label timeseries load and motion data—recorded by the smart hook while carrying this object—with the type of the object thus identified in the concurrent image or labeled by the human annotator; and then retrain non-visual load identification models based on these new labeled data.

15. Load Status

While the smart hook carries an object, the smart hook can also identify and broadcast its status to the remote computer system for publication to the manager portal. For example, as the output of the weight sensor indicates that the load carried by the smart hook is increasing at the start of a new lift event, the smart hook can transmit a "loading" status indicator to the remote computer system. Once the output of the weight sensor indicates that the load carried by the smart hook is consistent and sufficiently intransient, and as the altimeter indicates that the altitude of the smart hook is increasing, the smart hook can: store the current payload size read by the weight sensor as a weight of the object in the current lift event record; and transmit this weight and a "loaded, lifting" status indicator to the remote computer system for publication to the manager portal. If the output of the weight sensor indicates that the load carried by the smart hook is sufficiently intransient and greater than the stored tare value and if outputs of the altimeter and geospatial position module are sufficiently intransient, the smart hook can transmit a "loaded, static" status indicator to the remote computer system for publication to the manager portal.

Furthermore, if the output of the weight sensor indicates that the load carried by the smart hook is sufficiently intransient and greater than the stored tare value, if the altimeter indicates that the altitude of the smart hook is sufficiently intransient, and if outputs of the geospatial position module are changing, the smart hook can transmit a "loaded, moving laterally" status indicator to the remote computer system for publication to the manager portal. When the output of the weight sensor indicates that the load carried by the smart hook is sufficiently intransient and greater than the stored tare value and when outputs of the altimeter indicate that the smart hook is decreasing in altitude, the smart hook can transmit a "loaded, lowering" status indicator to the remote computer system for publication to the manager portal. As the output of the weight sensor then indicates that the load carried by the smart hook is decreasing, the smart hook can transmit an "unloading" status indicator to the remote computer system. Finally, when the output of the weight sensor reaches the stored tare value, the smart hook can: close (or "end") the new lift event record; and transmit an "unloaded" status indicator to the remote computer system for publication to the manager portal.

While the output of the weight sensor remains at approximately the stored tare value, the smart hook can return "unloaded, lifting," "unloaded, static," "unloaded, moving laterally," and "unloaded, lowering" status indicators to the remote computer system for publication to the manager portal.

Furthermore, the smart hook can: record timestamps of these status changes; record concurrent geospatial locations and altitudes of the smart hook; generate timestamped, georeferenced status indicators for these status changes; and write these timestamped, georeferenced status indicators to the lift event record.

16. Load Motion Tracking and Alert

Block S162 of the method S100 recites, in response to the timeseries of motion values deviating from the load handling specification during the lift event, activating an object motion alarm for the object during the second time period. Generally, in Block S162, the smart hook can selectively generate and distribute an object motion alarm in response to a position or motion of the object—detected from motion, load, and/or image data captured during the lift event—exceeding a corresponding position or motion threshold assigned to the object based on the type and other characteristics of the object (hereinafter a "motion event"), as shown in FIGS. 1 and 3.

In one implementation, in response to detecting a motion event during the lift event, the smart hook can: initialize a notification; populate the notification with a cause of the motion event (e.g., "pitch or roll exceeds a threshold," "swinging exceeds threshold amplitude," "resonance exceeds threshold amplitude"); and transmit the notification to the crane operator.

In one variation, the smart hook can also insert a recommendation for an action to recover from the motion event. For example, if the pendulum amplitude of the object exceeds a threshold pendulum amplitude or if the resonance amplitude of the object exceeds a resonance amplitude threshold, the smart hook can: insert—into the notification—a prompt to lower the object and/or retract the trolley toward the rotation table (e.g., to reduce torque on the base of the crane); and transmit this notification to a crane operator command center accessible to the crane operator. In another example, if the pitch angle of the object exceeds a threshold pitch angle or if the object is pitching at an amplitude or frequency exceeding corresponding thresholds, the smart hook can insert a prompt to adjust tension on guidelines—coupled to the object—to correct the orientation and/or motion of the object. The smart hook can then transmit this notification to both the crane operator command center and to mobile devices or wearable devices assigned to crane rigging personnel on the construction site.

In yet another example, if the smart hook predicts an increase in probability of partial or total load loss of the object due to changes in orientation or motion of the object, the smart hook can: retrieve a risk mitigation prompt (e.g., "move load away from structures and persons," "retract trolley toward rotation table to reduce base torque"); insert this risk mitigation prompt into the notification; and distribute this prompt to the crane operator command center and to nearby mobile devices.

Additionally or alternatively, in response to detecting a motion event during the lift event, the smart hook can transmit a notification for the motion event to a mobile device or account associated with a site manager at the construction site. For example, in response to detecting a motion event, the smart hook can generate a notification and populate the notification with motion event data, such as: a time of day; a type and weight of the object; a crane and crane operator identifier; and a description of the motion event, such as excess pitch, excess resonance, excess swinging, or increased risk of loss. The smart hook can then transmit this notification to a site manager portal or account associated with the site manager in (near) real-time.

Furthermore, in addition to transmitting an electronic notification to the crane operator, site manager, or other personnel, the smart hook can output an audible (e.g., by activating a siren) and/or visual alarm (e.g., by activating a strobe light) in order to communicate the motion event to personnel nearby.

(Alternatively, the smart hook can collect and transmit object orientation and motion data to the remote computer system during the lift event, and the remote computer system can execute the foregoing methods and techniques to selectively activate object motion alarms during the lift event in Block S162.)

However, the smart hook (or the remote computer system) can communicate the motion event to the crane operator, site manager, and/or other personnel in any other way in Block S162.

17. Buffer Distance Tracking and Alert

The method S100 further includes Blocks S172, S174, and S176, which recite: accessing a georeferenced boundary of a no-fly zone proximal the construction site; accessing a sequence of geospatial locations of the object, output by a position sensor coupled to the crane hook, during the second time period; and, in response to a geospatial location of the object falling within the buffer distance of the georeferenced boundary of the no-fly zone, activating an object location alarm, respectively. Generally, in Blocks S172, S174, and S176, the smart hook can monitor its geospatial location—and therefore the geospatial location of the centroid of the object in a horizontal plane—and selectively trigger an object location alarm if its geospatial location falls within the buffer distance of a nearest no-fly zone at the construction site (hereinafter a "location event"). In particular, in response to detecting a location event, the smart hook can: prompt a crane operator to move the smart hook away from the no-fly zone; notify a site manager of this location event (e.g., as a possible non-compliance event); and/or warn personnel nearby of this location event, as shown in FIGS. 1 and 3.

17.1 No-Fly Zone

As described above, the remote computer system can manager a geospatial map of no-fly zones within and around the construction site—that is, bounded volumes in which objects carried by the crane are barred from entering.

For example, the remote computer system can maintain a geospatial map that defines static (i.e., "fixed") no-fly zones, such as including: no-fly zones spanning areas of public streets and extending vertically upward beyond the height of the crane; no-fly zones spanning floor plans of buildings—outside of the site—and extending vertically upward beyond the height of the crane; and no-fly zones encircling and offset from power lines by a minimum present distance (e.g., five meters).

Additionally or alternatively, the remote computer system can update the geospatial map with dynamic no-fly zones that represent topographical changes within and around the construction site over time. For example, the remote computer system can define a no-fly zone around buildings within the site and modify this no-fly zone over time as the building is constructed. In this example, the remote computer system can: retrieve a 3D construction model representing a current build state on the construction site; extract a 3D envelope of the building from the 3D construction model; extend the 3D envelope by a minimum offset distance (e.g., ten meters vertically, five meters horizontally); and store the extended 3D envelope as a no-fly zone for a current date or time within the geospatial map. Therefore, in this example, the remote computer system can update a 3D georeferenced boundary of a no-fly zone around this building as construction progresses at the construction site, such as a based on a height of a tallest floor of feature currently in process within each wing of the building.

However, the remote computer system can store and/or update a static or dynamic geospatial map of georeferenced no-fly zones within and around the construction site in any other way. The remote computer system can then publish this geospatial map for access by the smart hook or push geospatial map updates to the smart hook over time.

17.2 Location Alarm Notification

Figure 4:
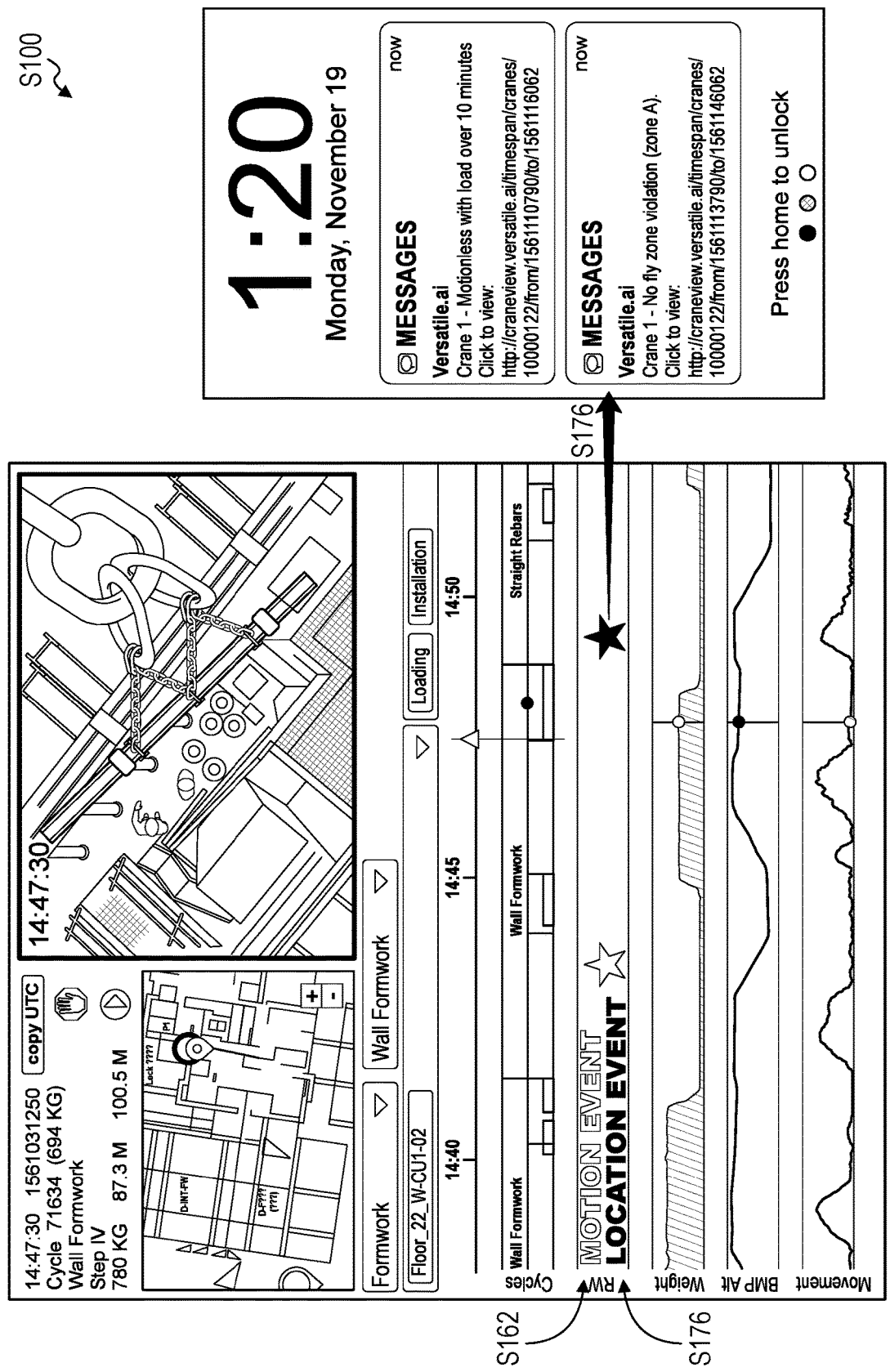
FIG. 4 is a flowchart representation of one variation of the method.

During operation, the smart hook can access this geospatial map from the remote computer system, shown in FIGS. 1 and 3. During a lift event, the smart hook can: record its current geospatial location from a geospatial position module integrated into the smart hook; calculate a buffer distance for an object currently carried by the smart hook based on real-time object motion and/or orientation data, as described above; calculate a shortest distance from the smart hook to a nearest no-fly zone represented in the geospatial map; and verify that this shortest distance is more than the buffer distance. However, if this shortest distance is less than the buffer distance, the smart hook can: activate an object location alarm; transmit a notification to the operator command center to prompt the crane operator to retract the smart hook from this nearest no-fly zone; output an audible and/or visual alarm to alert nearby personnel of the location event; and/or transmit a notification for the location event (e.g., as a possible non-compliance event) to a site manager, as shown in FIG. 4.

In one implementation, in response to detecting a location event during the lift event, the smart hook can: initialize a notification; populate the notification with a visualization of the no-fly zone nearest the object; highlight a region of the no-fly zone—depicted in the visualization—encroached by the object; insert a prompt to retract the smart hook from the no-fly zone; and transmit the notification to the operator command center. The crane operator may then view this notification within the operator command center and execute an action to retract the smart hook and the object from the no-fly zone accordingly.

Additionally or alternatively, the smart hook can populate the notification with a suggested action predicted to reduce the buffer distance for the object and thus deactivate the alarm, such as: lowering the smart hook to reduce a pendulum amplitude; or adjusting tension on guidelines—coupled to the object—to correct a pitch orientation and/or motion of the object. The smart hook can then distribute this notification to the crane operator and/or to nearby rigging personnel, as described above.

Therefore, the smart hook can execute Blocks S172, S174, and S176 of the method to preemptively prompt the crane operator to modify a trajectory of the smart hook and the object in order to avoid both: collision with power lines; and inadvertent deviation of the object in prescribed no-fly zones over other roads, buildings, structures, etc.

Furthermore, in addition to transmitting an electronic notification to the crane operator, site manager, or other personnel, the smart hook can output an audible (e.g., by activating a siren) and/or visual alarm (e.g., by activating a strobe light) in order to communicate the location event to nearby personnel.

Alternatively, the smart hook can collect and transmit geospatial location data to the remote computer system during the lift event, and the remote computer system can execute the foregoing methods and techniques to selectively activate object location alarms during the lift event in Block S176. For example, throughout the lift event, the smart hook can stream its geospatial location to the operator command center. Accordingly, the operator command center can: render the geospatial map of no-fly zones—within and around the construction site—within a graphical user interface; and update a location of a virtual representation of the smart hook and object within the graphical user interface based on this stream of geospatial locations received from the smart hook. The buffer duration can also: retrieve a buffer distance for the object received from the smart hook or locally calculate this buffer distance based on object orientation and position data received from the smart hook during this lift event; verify that the geospatial location of the smart hook is offset from all no-fly zones by more than the current buffer distance; and highlight—within the graphical user interface—any no-fly zone region that falls within this buffer distance of the current geospatial location of the smart hook and issue an audible or visual alarm for the crane operator accordingly. Upon viewing this graphical user interface, the crane operator may adjust the trajectory of the smart hook in order to move the smart hook further from this no-fly zone. Upon confirming this change in position of the smart hook relative to the no-fly zone, the operator command center can clear this alarm.

However, the smart hook (or the remote computer system) can communicate the location event to the crane operator, site manager, and/or other personnel in any other way in Block S176.

18. Lift Event Record

Block S150 of the method S100 recites generating a lift event record defining the type of the object, the payload size of the object, a pickup location at the first geospatial location, and a drop-off location at the second geospatial location. Generally, in Block S150, the smart hook can aggregate the various data—such as including object type, weight, motion, geospatial location, altitudes, and photographic images collected by the smart hook while an object is loaded on the smart hook—into a lift event record for this object, as shown in FIG. 1.

The smart hook can additionally or alternatively derive lift event metrics from these data and write these metrics to the lift event record. For example, in addition to load type, the smart hook can: identify a staging area where the object was stored based on the geospatial location and altitude of the smart hook when the object was first loaded onto the smart hook (i.e., the pickup location) and a local copy of a site map stored on the smart hook; identify a floor or level number and a wing or region of a building where the load was delivered based on the geospatial location and altitude of the smart hook when the object was unloaded and the site map; calculate an in-air time based on a duration between initial loading and final unloading of the object; calculate a static load time based on a duration of time that the smart hook was not moving laterally or vertically between the initial loading and final unloading of the object; and/or extract peak lateral speeds, peak vertical speeds, and peak height of the smart hook between the initial loading and final unloading of the object. The smart hook can then write these metrics to the lift event record for this object (such as in addition to or in place of raw sensor data recorded during this lift event).

Alternatively, the smart hook can transmit the lift event record for this object—including raw or filtered (e.g., denoised) sensor data—to the remote computer system upon completion of the lift event (e.g., when the output of the weight sensor returns to the stored tare value), and the remote computer system can extract the foregoing metrics from these sensor data. Yet alternatively, the smart hook can stream these sensor data to the remote computer system during the lift event, and the remote computer system can aggregate these data into a lift event record and derive the foregoing metrics and smart hook statuses from these data.

The remote computer system can also update the manager portal to reflect these metrics, such as in real-time during the lift event or upon conclusion of the lift event. The remote computer system can also store lift event records in a remote database; and the manager portal can then retrieve an individual lift event record from the database and render these metrics and other data contained in this lift event record when selected by the site manager or other operator at the manager portal.

Furthermore, in response to the smart hook (or the remote computer system) detecting a motion event during this lift event, the remote computer system can write a motion control flag to the lift event record for this lift event in Block S164. For example, the remote computer system can populate this motion control flag with a timestamp and a description of the motion event, such as excess pitch, excess resonance, excess swinging, increased risk of loss. The smart hook can then transmit this notification to a site manager portal or account associated with the site manager in (near) real-time. The remote computer system can then write this motion control flag to the lift event record.

Similarly, in response to the smart hook (or the remote computer system) detecting a location event during this lift event, the remote computer system can write a location control flag to the lift event record for this lift event in Block S164. For example, the remote computer system can annotate a geospatial map with: a timeseries of geospatial locations of the smart hook over a period of time in which the smart hook transitioned from a distance exceeding the buffer distance from a nearest no-fly zone to a distance less than the buffer distance from this nearest no-fly zone; and a boundary of this no-fly zone. The remote computer system can then: flag a subset of geospatial locations—within this sequence of geospatial locations—that fall within the buffer distance of this no-fly zone; and store this annotated geospatial map in association with the lift event record. Additionally or alternatively, the remote computer system can write this timeseries of geospatial locations of the smart hook and a georeferenced location of the no-fly zone at the time of this lift event to the lift event record. Additionally or alternatively, the remote computer system can store the buffer distance (and object motion and/or orientation data from which this buffer distance was calculated) at the time of the location event in the lift event record. The remote computer system can later reconstruct a visualization of this location event during this lift event based on these object type, motion, orientation, and geospatial location data and the geospatial location of the no-fly zone stored in this lift event record, thereby enabling a site manager or other entity to review and visualize this location event and the crane operator's response to this location event in real-time or at a later date.

19. Object Distribution Update

Furthermore, once the smart hook (or the remote computer system) identifies a type of an object loaded onto the smart hook, the smart hook (or the remote computer system) can update a table, spreadsheet, sitemap, or other electronic document to reflect removal of an object of this type—and of a weight measured by the smart hook—at the geospatial location of the smart hook when loaded with the object. Similarly, once the smart hook (or the remote computer system) determines that the object has been unloaded from the smart hook, the smart hook (or the remote computer system) can update the table, spreadsheet, sitemap, or other electronic document to reflect placement of an object of this type—and of the weight measured by the smart hook—at this geospatial location of the smart hook when the object is unloaded from the smart hook.

20. Autonomous Cranes

In one variation, rather than transmit notifications and other alerts to a human crane operator, the smart hook (or the remote computer system) transmits alarms and/or prompts to an autonomous crane controller in order to trigger the autonomous crane controller to automatically modify operation of the crane responsive to a motion or location event The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for monitoring lift events at a construction site comprising:
   accessing a first timeseries of load values output by a load sensor, coupled to a crane hook, during a first time period;
   deriving a set of characteristics of an object carried by the crane hook during the first time period based on the first timeseries of load values;
   selecting a load handling specification for the object based on the set of characteristics of the object;
   selecting a buffer distance for the object based on the set of characteristics of the object;
   accessing a georeferenced boundary of a no-fly zone proximal the construction site; and
   during a second time period succeeding the first time period:
      accessing a second timeseries of load values output by the load sensor;

accessing a sequence of geospatial locations of the object, output by a position sensor coupled to the crane hook, during the second time period;

in response to the second timeseries of load values deviating from the load handling specification, activating an object motion alarm for the object; and in response to a geospatial location, in the sequence of geospatial locations of the object, falling within the buffer distance of the georeferenced boundary of the no-fly zone, activating an object location alarm.

2. The method of claim 1, further comprising, during the second time period:

detecting a pitch orientation of the object relative to the crane hook;

detecting a yaw rate of the object based on a second timeseries of motion values;

detecting a pendulum amplitude of the crane hook based on the second timeseries of motion values;

calculating a probability of partial loss of the object based on the pitch orientation, the yaw rate, and the pendulum amplitude; and adjusting the buffer distance proportional to the probability of partial loss of the object.

3. The method of claim 1:

wherein deriving the set of characteristics of the object based on the first timeseries of load values comprises deriving a first lifting profile, representing transition of a first weight of the object to the crane hook over a first loading duration, from the first timeseries of load values;

further comprising:

accessing a first timeseries of motion values output by a motion sensor, coupled to the crane hook, during the first time period;

deriving a sloshing frequency of the object from the first timeseries of motion values;

identifying the object as a concrete hopper based on the first loading duration and the sloshing frequency; and wherein selecting the load handling specification for the object comprises selecting the load handling specification, from a set of load handling specifications, for concrete hoppers in response to identifying the object as the concrete hopper;

wherein selecting the buffer distance for the object comprises selecting the buffer distance of a first magnitude for the object in response to identifying the object as the concrete hopper; and further comprising:

accessing the second timeseries of load values output by the load sensor during a third time period;

accessing a second timeseries of motion values output by the motion sensor during the third time period;

deriving a second lifting profile, representing transition of a second weight of a second object to the crane hook over a second loading duration, from the second timeseries of load values;

deriving a natural frequency of the second object from the second timeseries of motion values;

identifying the second object as rebar based on the second loading duration and the natural frequency; and selecting a second load handling specification, from the set of load handling specifications, for rebar in response to identifying the object as rebar; and selecting a second buffer distance of a second magnitude, greater than the first magnitude, for the second object in response to identifying the object as rebar.

4. The method of claim 1:

wherein activating the object motion alarm for the object comprises, in response to the second timeseries of load values deviating from the load handling specification:

transmitting a first notification for the object motion alarm to a crane operator command center; and transmitting a second notification for the object motion alarm to mobile devices associated with rigging personnel at the construction site; and wherein activating the object location alarm comprises, in response to the geospatial location falling within the buffer distance of the georeferenced boundary of the no-fly zone:

transmitting a third notification for the object location alarm to the crane operator command center; and transmitting a fourth notification for the object motion alarm to a computing device associated with a site manager at the construction site.

5. A method for monitoring lift events at a construction site comprising:

accessing a first timeseries of load values output by a load sensor, coupled to a crane hook, during a first time period;

accessing a first timeseries of motion values output by a motion sensor, coupled to the crane hook, during the first time period;

deriving a lifting profile from the first timeseries of load values;

deriving an oscillation characteristic from the first timeseries of motion values;

identifying a type of an object carried by the crane hook during the first time period based on the lifting profile and the oscillation characteristic;

selecting a load handling specification for the object based on the type of the object;

accessing a second timeseries of motion values output by the motion sensor during a second time period succeeding the first time period; and in response to the second timeseries of motion values deviating from the load handling specification, activating an object motion alarm for the object during the second time period.

6. The method of claim 5, further comprising:

estimating a payload size of the object based on the first timeseries of load values;

recording a first geospatial location of the crane hook during the first time period;

accessing a third timeseries of load values output by the load sensor during a third time period succeeding the second time period;

detecting unloading of the object from the crane hook during the third time period based on the third timeseries of load values;

recording a second geospatial location of the crane hook during the third time period;

populating a lift event record for the object with the type of the object, the payload size of the object, a pickup location at the first geospatial location, and a drop-off location at the second geospatial location; and in response to the second timeseries of motion values deviating from the load handling specification, writing a motion control flag to the lift event record for the object.

7. The method of claim 5:
further comprising:
estimating a payload size of the object based on the first timeseries of load values;
accessing an altitude, output by an altimeter coupled to the crane hook, during the second time period; and
predicting a line length, carrying the crane hook, based on the altitude;
wherein selecting the load handling specification for the object comprises calculating a pendulum motion amplitude threshold for the object:
proportional to the line length; and
inversely proportional to the payload size of the object; and
further comprising calculating a magnitude of lateral oscillation of the object during the second time period based on the second timeseries of motion values; and
wherein activating the object motion alarm comprises activating the object motion alarm in response to the magnitude of lateral oscillation of the object exceeding the pendulum motion amplitude threshold during the second time period.

8. The method of claim 5, wherein activating the object motion alarm for the object during the second time period comprises, during the second time period, in response to the second timeseries of motion values deviating from the load handling specification:
transmitting the object motion alarm to a crane operator command center; and
transmitting the object motion alarm to a mobile device associated with a site manager at the construction site.

9. The method of claim 5:
wherein deriving the lifting profile from the first timeseries of load values comprises deriving the lifting profile, representing transition of a weight of the object to the crane hook over a loading duration, from the first timeseries of load values;
wherein deriving the oscillation characteristic from the first timeseries of motion values comprises deriving a sloshing frequency from the first timeseries of motion values;
wherein identifying the type of the object comprises identifying the object as a concrete hopper based on the loading duration and the sloshing frequency; and
wherein selecting the load handling specification for the object comprises selecting the load handling specification, from a set of load handling specifications, for concrete hoppers based on the type of the object.

10. The method of claim 9:
wherein selecting the load handling specification for the object comprises:
estimating a fill level of the concrete hopper proportional to the sloshing frequency; and
selecting the load handling specification specifying a first pendulum amplitude threshold and a first pitch threshold inversely proportional to the fill level;
further comprising:
interpreting a first pendulum amplitude of the object during the second time period based on the second timeseries of motion values; and
interpreting a first pitch amplitude of the object during the second time period based on the second timeseries of motion values; and
wherein activating the object motion alarm for the object during the second time period comprises activating the object motion alarm in response to one of:
the first pendulum amplitude of the object exceeding the first pendulum amplitude threshold; and
the first pitch amplitude of the object exceeding the first pitch threshold.

11. The method of claim 10, further comprising:
accessing a third timeseries of load values output by the load sensor during a third time period;
accessing a third timeseries of motion values output by the motion sensor during the third time period;
deriving a second lifting profile, representing transition of a second weight of a second object to the crane hook over a second loading duration greater than the first duration, from the third timeseries of load values;
deriving a natural frequency of the second object, greater than the sloshing frequency, from the third timeseries of motion values;
identifying the second object, carried by the crane hook during the third time period, as an elongated structural member based on the second loading duration and the natural frequency of the second object;
in response to identifying the second object as the elongated structural member, selecting a second load handling specification for the second object specifying:
a second pendulum amplitude threshold less than the first pendulum amplitude threshold; and
a pitch angle threshold;
accessing a fourth timeseries of motion values output by the motion sensor during a fourth time period succeeding the third time period;
tracking a pitch angle of the second object during the fourth time period; and
issuing a second object motion alarm for the second object during the fourth time period in response to one of:
the second pendulum amplitude of the second object exceeding the first pendulum amplitude threshold; and
the pitch angle of the second object exceeding the pitch angle threshold.

12. The method of claim 11:
further comprising, during the fourth time period, capturing a video frame from a downward-facing camera coupled to the crane hook; and
wherein tracking the pitch angle of the second object during the fourth time period comprises:
extracting a set of features from the video frame; and
calculating the pitch angle of the second object relative to the crane hook based on the set of features.

13. The method of claim 5:
wherein deriving the oscillation characteristic from the first timeseries of motion values comprises estimating a natural frequency of the object based on the first timeseries of motion values;
further comprising estimating a payload size of the object based on the first timeseries of load values;
wherein selecting the load handling specification for the object comprises calculating a resonance amplitude threshold at the natural frequency of the object inversely proportional to the payload size of the object;
further comprising calculating a resonance amplitude of the object at the natural frequency during the second time period based on the second timeseries of motion values; and
wherein activating the object motion alarm comprises activating the object motion alarm in response to the resonance amplitude of the object exceeding the resonance amplitude threshold at the natural frequency during the second time period.

14. The method of claim 5, further comprising:
selecting a buffer distance for the object based on the type of the object;
accessing a georeferenced boundary of a no-fly zone proximal the construction site; and
during the second time period:
  accessing a sequence of geospatial locations of the object, output by a position sensor coupled to the crane hook, during the second time period; and
  in response to a geospatial location of the object falling within the buffer distance of the georeferenced boundary of the no-fly zone, activating an object location alarm.

15. The method of claim 14, further comprising:
interpreting a pendulum amplitude of the object during the second time period based on the second timeseries of motion values; and
adjusting the buffer distance proportional to the pendulum amplitude of the object during the second time period.

16. The method of claim 14:
wherein deriving the oscillation characteristic from the first timeseries of motion values comprises estimating a natural frequency of the object based on the first timeseries of motion values;
further comprising:
  estimating a horizontal span of the object based on the type of the object and the natural frequency of the object; and
  adjusting the buffer distance proportional to the horizontal span of the object during the second time period.

17. The method of claim 14, further comprising:
annotating a geospatial map with the sequence of geospatial locations of the object;
flagging a subset of geospatial locations, within the sequence of geospatial locations of the object, that fall within the buffer distance of the no-fly zone; and
generating a lift event record defining the type of the object, indicating the object location alarm for the object, and comprising the geospatial map.

18. A method for monitoring lift events at a construction site comprising:
accessing a first timeseries of load values output by a load sensor, coupled to a crane hook, during a first time period;
deriving a set of characteristics of an object carried by the crane hook during the first time period based on the first timeseries of load values;
identifying a type of the object based on the set of characteristics;
selecting a buffer distance for the object based on the type of the object;
accessing a georeferenced boundary of a no-fly zone proximal the construction site;
accessing a sequence of geospatial locations of the object, output by a position sensor coupled to the crane hook, during a second time period succeeding the first time period; and
in response to a geospatial location, in the sequence of geospatial locations of the object, falling within the buffer distance of the georeferenced boundary of the no-fly zone, activating an object location alarm during the second time period.

19. The method of claim 18:
further comprising:
  accessing a first timeseries of motion values output by a motion sensor, coupled to the crane hook, during the first time period;
  extracting an oscillation characteristic from the first timeseries of motion values;
wherein deriving the set of characteristics of the object based on the first timeseries of load values comprises extracting a lifting profile from the first timeseries of load values;
wherein identifying the type of the object comprises identifying the type of the object based on the oscillation characteristic and the lifting profile;
further comprising:
  selecting a load handling specification for the object based on the type of the object;
  accessing a second timeseries of motion values output by the motion sensor, coupled to the crane hook, during a second time period succeeding the first time period; and
  in response to the second timeseries of motion values deviating from the load handling specification, generating a second object motion alarm for the object during the second time period.

20. The method of claim 19, further comprising:
interpreting a pendulum amplitude of the object during the second time period based on the second timeseries of motion values; and
adjusting the buffer distance proportional to the pendulum amplitude of the object during the second time period.

* * * * *